US006704579B2

(12) United States Patent
Woodhead et al.

(10) Patent No.: US 6,704,579 B2
(45) Date of Patent: Mar. 9, 2004

(54) SYSTEM AND METHOD OF AUTOMATICALLY CALIBRATING THE GAIN FOR A DISTRIBUTED WIRELESS COMMUNICATION SYSTEM

(75) Inventors: David Woodhead, Del Mar, CA (US); Brian Spinar, San Diego, CA (US); David Gazelle, Givaat Shemuel (IL); Sheldon L. Gilbert, San Diego, CA (US)

(73) Assignee: Ensemble Communications, San Diego, CA (US)

( * ) Notice: Subject to any disclaimer, the term of this patent is extended or adjusted under 35 U.S.C. 154(b) by 554 days.

(21) Appl. No.: 09/789,940

(22) Filed: Feb. 15, 2001

(65) Prior Publication Data

US 2002/0119797 A1 Aug. 29, 2002

(51) Int. Cl.[7] ................................................ H04Q 7/00
(52) U.S. Cl. ........................ 455/522; 455/69; 455/561
(58) Field of Search ............................ 455/3.01, 426.2, 455/69, 522, 561; 370/335, 342

(56) References Cited

U.S. PATENT DOCUMENTS

| 3,949,404 A | 4/1976 | Fletcher et al. |
| 4,495,619 A | 1/1985 | Acampora |
| 5,297,144 A | 3/1994 | Gilbert et al. |
| 5,420,851 A | 5/1995 | Seshadri et al. |
| 5,444,698 A | 8/1995 | Kito |
| 5,511,082 A | 4/1996 | How et al. |
| 5,615,212 A | 3/1997 | Ruszczyk et al. |
| 5,638,371 A | 6/1997 | Raychaudhuri et al. |
| 5,638,374 A | 6/1997 | Heath |
| 5,675,573 A | 10/1997 | Karol et al. |
| 5,678,228 A | * 10/1997 | Soleimani et al. ....... 455/343.2 |
| 5,751,708 A | 5/1998 | Eng et al. |
| 5,768,254 A | 6/1998 | Papadopoulos et al. |
| 5,828,695 A | 10/1998 | Webb |
| 5,859,619 A | 1/1999 | Wu et al. |
| 5,890,055 A | 3/1999 | Chu et al. |

(List continued on next page.)

OTHER PUBLICATIONS

Lin., et al., "*Error Control Coding Fundamentals and Applications*", Prentice–Hall Computer Applications in Electrical Engineering Series., 1993, pp. 315–349.
L.H. Charles Lee, "Convolutional Coding, Fundamentals and Applications", Artech House, Inc., 1997, p. 11–51.
Redl, et al., "An Introduction to GSM", Artech House, Inc., 1995; pp. 84, 85 and 95.
C.E. Shannon, "A Mathematical Theory of Communication", Bell System Technical Journal, pp. 379–423 (Part 1), 623–656 (Part II), Jul. 1948.

(List continued on next page.)

*Primary Examiner*—Nay Maung
*Assistant Examiner*—Tan Trinh
(74) *Attorney, Agent, or Firm*—Knobbe, Martens, Olson & Bear LLP

(57) ABSTRACT

A system and method providing a wireless broadband connection between base stations and customer sites. The system includes indoor units, within the base stations and customer sites, that communicate across cables to outdoor units. The indoor units link to routers, switches and other devices and services. The outdoor units transmit and receive wireless data and send it to the indoor units. The indoor units control the functioning of the outdoor units by transmitting digital messages along the interface cables. The outdoor units report various detector values to the indoor units, which allows the indoor units to tune and adjust several functions within the outdoor units. Several embodiments for automatically calibrating the receive path gain in the base stations to compensate for the base station cable between the indoor unit and outdoor unit are described. In addition, an improved transmit power control technique which is not affected by modulation type, is also described.

40 Claims, 12 Drawing Sheets

U.S. PATENT DOCUMENTS

| | | | | |
|---|---|---|---|---|
| 5,995,851 | A | * 11/1999 | Lim | 455/561 |
| 6,006,069 | A | 12/1999 | Langston | |
| 6,016,311 | A | 1/2000 | Gilbert et al. | |
| 6,016,313 | A | 1/2000 | Foster, Jr. et al. | |
| 6,038,455 | A | 3/2000 | Gardner et al. | |
| 6,094,421 | A | 7/2000 | Scott | |
| 6,108,561 | A | * 8/2000 | Mallinckrodt | 455/522 |
| 6,112,080 | A | 8/2000 | Anderson et al. | |
| 6,141,356 | A | * 10/2000 | Gorman | 370/493 |
| 6,157,668 | A | * 12/2000 | Gilhousen et al. | 375/130 |
| 6,178,334 | B1 | * 1/2001 | Shyy et al. | 455/503 |
| 6,226,525 | B1 | * 5/2001 | Boch et al. | 455/522 |
| 6,256,483 | B1 | * 7/2001 | Moerder et al. | 455/115.1 |
| 6,418,301 | B1 | * 7/2002 | Le et al. | 455/73 |
| 6,463,089 | B1 | * 10/2002 | Chauncey et al. | 375/131 |
| 6,512,751 | B1 | * 1/2003 | Struhsaker et al. | 370/329 |
| 6,549,542 | B1 | * 4/2003 | Dong et al. | 370/441 |
| 6,600,929 | B1 | * 7/2003 | Toncich et al. | 455/522 |
| 2001/0001764 | A1 | * 5/2001 | Davarian et al. | 455/522 |
| 2002/0001337 | A1 | * 1/2002 | Chauncey et al. | 375/132 |
| 2002/0016158 | A1 | * 2/2002 | Shibuya et al. | 455/232.1 |
| 2002/0019235 | A1 | * 2/2002 | Kim et al. | 455/451 |
| 2002/0032001 | A1 | * 3/2002 | Fischer et al. | 455/3.01 |
| 2002/0036985 | A1 | * 3/2002 | Jonas et al. | 370/235 |
| 2002/0098803 | A1 | * 7/2002 | Poulton et al. | 455/13.1 |
| 2003/0100260 | A1 | * 5/2003 | Meirzon et al. | 455/13.4 |
| 2003/0143945 | A1 | * 7/2003 | Chadwick | 455/3.01 |

OTHER PUBLICATIONS

Ulm., et al., "Data–Over–Cable Interface Specifications, Radio Frequency Interface Specification", Hewlett Packard Interim Specification, Doc. Control No.: SP–RFII01–970321, published Mar. 21, 1997 by MCNS Holdings, L.P., Section 6, pp. 43–85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice Hall, Oct. 1995, Chapter 3, pp. 21–25.

* cited by examiner

SYSTEM AND METHOD OF AUTOMATICALLY CALIBRATING THE GAIN FOR A DISTRIBUTED WIRELESS COMMUNICATION SYSTEM

BACKGROUND OF THE INVENTION

1. Field of the Invention

Aspects of the present invention generally relate to wireless communication systems. More particularly, embodiments of the present invention relate to a wireless communication system that provides telephone, data and Internet connectivity to a plurality of users.

2. Description of Related Art

Several systems are currently in place for connecting computer users to one another and to the Internet. For example, many companies such as Cisco Systems, provide data routers that route data from personal computers and computer networks to the Internet along conventional twisted pair wires and fiber optic lines. These same systems are also used to connect separate offices together in a wide area data network.

However, these systems suffer significant disadvantages because of the time and expense required to lay high capacity communications cables between each office. This process is time consuming and expensive. What is needed in the art is a high capacity system that provides data links between offices, but does not require expensive communication cables to be installed.

Many types of current wireless communication systems facilitate two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit user with the fixed network infrastructure (usually a wired-line system). Several types of systems currently exist for wirelessly transferring data between two sites. For example, prior art wireless communication systems have typically used a Code Division Multiple Access (CDMA), Time Division Multiple Access (TDMA) or Frequency Division Multiple Access (FDMA) type system to facilitate the exchange of information between two users. These access schemes are well known in the art.

As can be imagined, in any of these type of wireless communication systems there are many components that need to be adjusted and tuned so that the system can compensate for frequency shifts and atmospheric disturbances. For example, high or low humidity and temperature, or rain, snow and wind can affect wireless communication systems. Thus, what is needed in the art is a convenient system that detects temperature and/or power levels in the wireless communication transmission and automatically adjusts components within the system to provide for maximum data transmission efficiency.

Furthermore, on the base station side of many radio frequency systems, the gain of the receive (and transmit) path is not completely deterministic and not known in advance due mainly to differing amounts of cable length required to connect the roof-top radio and antenna to the indoor equipment. Like the transmit path, the receive path must be compensated (calibrated) in some manner to produce a known signal level at various points in the receive chain for optimal performance of the system. This compensation or path calibration is ordinarily done by sending a known signal level into the path and adjusting the gain(s) along the path until the signal level measured along the path is at the desired level. This obviously requires some sort of signal generator to produce the signal for this calibration process. In the base station, in the transmit direction, the signal generator could be the base station equipment itself. In the receive direction, there is no "built-in" signal generator for the calibration.

This problem can be solved in various ways, some of which are by using equipment external to the base station itself, by including a signal generator in the base station receive path hardware, or by using some sort of transmit signal loop-back scheme in the radio. All of these techniques incur some amount of additional expense and/or complexity in the base station design and/or installation. Thus, what is needed is a way to compensate for the differing cable lengths without incurring additional expense and/or complexity in the base station design and/or installation.

Furthermore, the output power stability of the roof-top radio may be directly affected by the gain of the transmitter circuits. The transmit power should be as high as possible to optimize range but not so high as to cause excessive signal distortion. Thus, what is needed is a way to control the transmitter power so as to provide an optimum transmit power to operate at under all conditions and that is not affected by modulation type.

SUMMARY OF THE INVENTION

One aspect of the present invention includes a method of automatically calibrating the gain of an indoor unit of a base station having an outdoor unit and a broadband cable connecting the indoor unit and outdoor unit in a wireless communication system having customer sites, the method comprising determining which customer sites are not operating at maximum power; measuring, for a customer site not operating at maximum power, average received power at the outdoor unit; comparing the average received power to a nominal level; and increasing the gain of the indoor unit if the average received power is greater than the nominal level or decreasing the gain of the indoor unit if the average received power is less than the nominal level.

Another aspect of the present invention includes a base station, configured to automatically calibrate a receive path gain, for use in a wireless communication system having customer sites, the base station comprising an outdoor unit configured to receive signals from the customer sites, wherein the signals include power readings from the customer sites; a broadband cable connected to the outdoor unit; and an indoor unit connected to the broadband cable and configured to receive message data from the outdoor unit through the broadband cable, wherein the indoor unit includes a processor configured to determine which customer sites are not operating at maximum power, instruct the outdoor unit to measure, for a customer site not operating at maximum power, average received power at the outdoor unit, compare the average received power to a nominal level, and increase the gain of the indoor unit if the average received power is greater than the nominal level or decrease the gain of the indoor unit if the average received power is less than the nominal level.

Another aspect of the present invention includes a method of automatically calibrating a receive path gain of a base station having an indoor unit, an outdoor unit and a broadband cable connecting the indoor unit and the outdoor unit in a wireless communication system having one or more customer sites, the method comprising wirelessly receiving signals from one or more customer sites; measuring, for a customer site not operating at maximum power, power of the received signal at the outdoor unit; comparing the power of the received signal to a predetermined level; and increasing a receive path gain of the indoor unit if the power of the received signal is greater than the predetermined level or decreasing the receive path gain of the indoor unit if the power of the received signal is less than the predetermined level.

Another aspect of the present invention includes a method of automatically controlling the transmit power of a customer site by a base station having an indoor unit, an outdoor unit and a broadband cable connecting the indoor unit and the outdoor unit in a wireless communication system so as to automatically compensate for losses due to the cable, the method comprising wirelessly receiving a signal from a customer site that has started to transmit the signal, measuring power of the received signal at the indoor unit, comparing the power of the received signal to a predetermined level, requesting the customer site to decrease the transmit power if the power of the received signal is greater than the predetermined level or requesting the customer site to increase the transmit power if the power of the received signal is less than the predetermined level, and providing a maximum power status to the base station if the customer site is operating at maximum power so as to control automatic compensation for losses due to the base station cable.

Another aspect of the present invention includes a base station configured to automatically calibrate a receive path gain in a wireless communication system having customer sites, the base station comprising an outdoor unit wirelessly receiving signals from the customer sites, wherein the signals include power levels of one or more of the customer sites; a broadband cable connected to the outdoor unit; and an indoor unit connected to the broadband cable and receiving message data from the outdoor unit through the broadband cable, wherein the indoor unit includes a processor configured to measure, for a customer site not operating at maximum power, power of the received signal at the outdoor unit, compare the power of the received signal to a predetermined level, and increase a receive path gain of the indoor unit if the power of the received signal is greater than the predetermined level or decrease the receive path gain of the indoor unit if the power of the received signal is less than the predetermined level.

Another aspect of the present invention includes a base station for maintaining transmit peak power at a constant level regardless of modulation type for use in a wireless communication system, the base station comprising an indoor unit having a modem configured to provide an output and to use multiple modulation types within a single time division duplexing frame; an outdoor unit connected to the indoor unit and having a transmit system configured to upconvert the output of the modem, the outdoor unit comprising a wideband detector configured to monitor a transmit system output signal; a sample and hold circuit connected to the wideband detector, the sample and hold circuit having a gate input; a delay circuit receiving a transmit/receive control signal and providing an output to the gate input of the sample and hold circuit; a transmit level adjust circuit configured to provide a predetermined transmit output level; and a comparator configured to compare the predetermined transmit output level with the output of the sample and hold circuit so as to generate an error signal to maintain transmit peak power at a constant level.

Another aspect of the present invention includes a subsystem for maintaining transmit peak power at a constant level regardless of modulation type in an outdoor unit of a wireless communication system, the subsystem comprising a wideband detector configured to monitor a transmit output signal; a sample and hold circuit connected to the wideband detector, the sample and hold circuit having a gate input; a delay circuit providing an output, indicative of a time in the transmit output signal when a known modulation type occurs, to the gate input of the sample and hold circuit; a transmit level adjust circuit configured to provide a predetermined transmit output level; and a comparator configured to compare the predetermined transmit output level with the output of the sample and hold circuit so as to generate an error signal used to maintain transmit peak power at a constant level.

Yet another aspect of the present invention includes a method of maintaining transmit peak power at a constant level regardless of modulation type in an outdoor unit of a time division duplexing wireless communication system, the method comprising providing a control signal at a predetermined time delay after a transition from a receive mode to a transmit mode, measuring the amplitude of a transmit output signal based on the delayed control signal, providing a predetermined transmit output level, comparing the predetermined transmit output level with the amplitude of the transmit output signal, and generating a signal representative of the comparing so as to maintain transmit peak power at a constant level.

BRIEF DESCRIPTION OF THE DRAWINGS

Like reference numbers and designations in the various drawings indicate like elements.

DETAILED DESCRIPTION OF THE INVENTION

Figure 1:
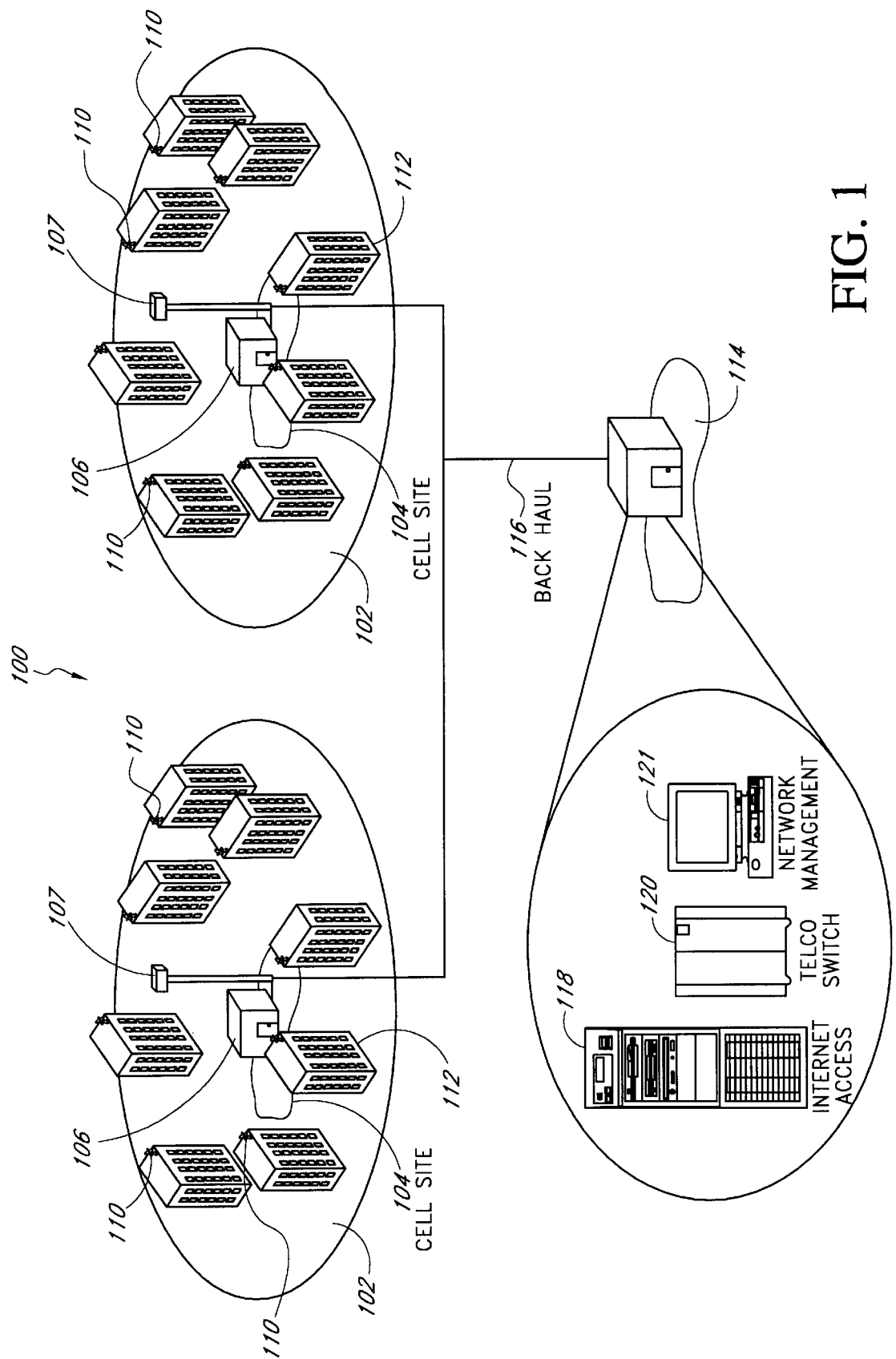
FIG. 1 is a block diagram of an exemplary broadband wireless communication system for use with the present invention.

Throughout this description, the embodiments and examples shown should be considered as exemplars, rather than as limitations on the present invention. The following detailed description presents a description of certain specific embodiments of the present invention. However, the present invention may be embodied in a multitude of different ways as defined and covered by the claims.

A. Overview of the Wireless Communication System

As described above, embodiments of the present invention relate to a broadband wireless communication system. The system is particularly useful for linking a plurality of customers and businesses together to share data or access the Internet. In general, the system provides base stations that are centrally located from a plurality of customer sites. The base stations are linked to services desired by customers, such as Internet access, satellite access, telephone access and the like. Within the base stations may be communication devices, such as routers, switches and systems for communications with the desired services. In addition, each base station includes one or more antennas for connecting wirelessly with one or more customer sites.

A customer desiring, for example, access to the Internet will install a set of Customer Premises Equipment (CPE) that includes an antenna and other hardware, as described in detail below, for providing a high speed wireless connection to one or more base stations. Through the high-speed wireless connection, the customer is provided with access to the Internet or to other desired services. As discussed below, the data transmitted wirelessly between a base station and a customer site is termed herein "user data". Of course, at each customer site, a plurality of simultaneous computers can be provided with wireless access to the base station through the use of hubs, bridges and routers.

In one embodiment, the base station comprises a plurality of indoor units (IDU) that communicate with a back-haul interface and a plurality of outdoor units (ODU) that transmit/receive data from the customer sites. Each indoor unit typically includes, or communicates with, a modem for modulating/demodulating user data going to/from the outdoor unit.

In one embodiment, each of the indoor units is connected to only one outdoor unit and each IDU/ODU pair transmits and receives user data with a unique frequency. This format provides a base station with, for example, 10, 20, 30 or more IDU/ODU pairs that each communicate with customer sites using unique frequencies. This provides the base station with a means for communicating with many customer sites, yet dividing the bandwidth load between several frequencies. Of course, a base station that serves a small community of customer sites might only have a single IDU/ODU pair. Alternatively, one IDU can be connected to multiple ODU's or one ODU can be connected to multiple IDU's.

Each ODU at the base station is normally located outside of the physical building and includes an integrated broadband antenna for transmitting/receiving wireless user data packets to/from the customer sites. Of course, the antenna does not need to be integrated with the ODU, and in one embodiment is located external to the ODU.

The ODU and the IDU communicate with one another through a broadband cable connection, such as provided by an RG-6 cable. In one embodiment the ODU and IDU communicate across about 10 to 100 feet of cable. In another embodiment, the ODU and IDU communicate across about 100 to 500 feet of cable. In yet another embodiment, the ODU and the IDU communicate across about 500 to 1000 feet of cable.

In one embodiment, the IDU controls functions within the ODU by sending control messages in addition to the user data stream. The IDU passes messages to the ODU in order for the IDU to control certain aspects of the ODU's performance. For example, the IDU may determine that the system needs to be tuned in order to maximize the signal strength of the user data being received. The IDU will send a control message in the form of a frequency shift key (FSK) modulated signal, as described below, to the ODU along the broadband cable. The control message may include the identity of a variable voltage attenuator (VVA) or other type of attenuator in the ODU and a new setting for the designated VVA. An onboard microcontroller in the ODU reads and interprets the control message coming from the IDU and sends the proper signals to the designated VVA.

Once the ODU has adjusted the designated VVA, the microcontroller in the ODU sends a response in the form of a response message back along the broadband cable to the IDU. The response message may include a confirmation of the new VVA setting, or other data to confirm that the requested control message has been fulfilled.

It should be realized that the base stations and the customer sites each have indoor units and outdoor units that function similarly to provide a communication link between the external antenna and the electronic systems in the interior of the buildings. Of course, in one embodiment within the customer sites, the indoor units are connected through routers, bridges, Asynchronous Transfer Mode (ATM) switches and the like to the customer's computer systems, which can also include telecommunication systems. Within the base stations, the indoor units are connected to a back-haul interface that connects directly to a service provider's network. The service provider's network may include switches, routers and other subsystems that provide access to the services desired by the customers.

Figure 2:
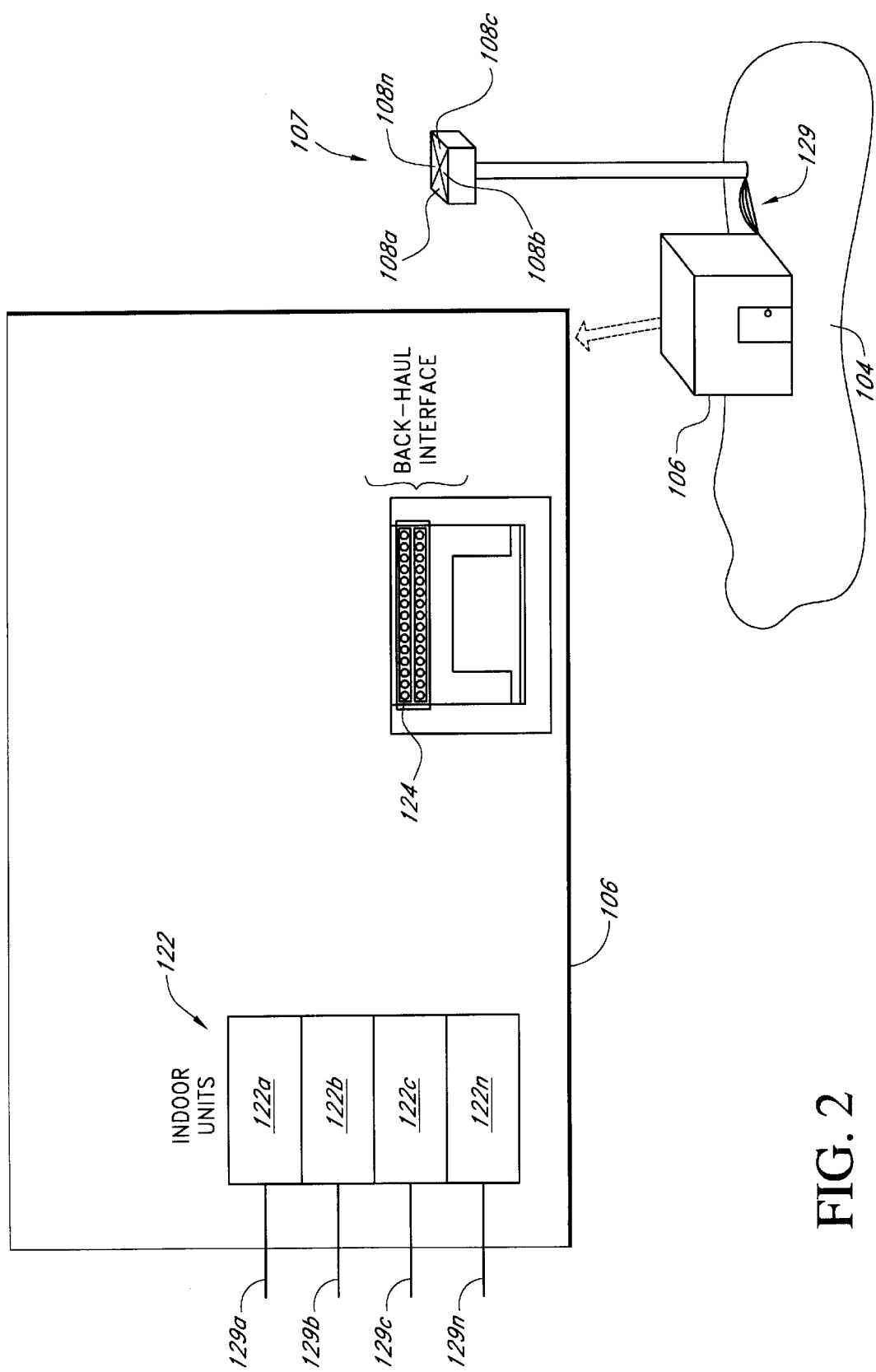
FIG. 2 is a block diagram of cell site used in the wireless communication system of FIG. 1.

Referring now to FIG. 1, a wireless communication system 100 comprises a plurality of cells 102. Each cell 102 contains an associated cell site 104 which primarily includes a base station 106 having a base station indoor unit (not shown). The base station receives and transmits wireless user data through a base station outdoor unit 107, which may represent a group of outdoor units 108a, 108b, 108c, through 108n as shown in FIG. 2. A communication link transfers control signals and user data between the base station indoor unit (IDU) and the base station outdoor unit (ODU). The communication protocols between the base station IDU and base station ODU will be discussed more thoroughly in the following sections.

Each cell 102 within the wireless communication system 100 provides wireless connectivity between the cell's base station 106 and a plurality of customer premises equipment (CPE) located at fixed customer sites 112 throughout the coverage area of the cell 102. The customer premises equipment normally includes at least one indoor unit (not shown) and one customer ODU 110. Users of the system 100 can be both residential and business customers. As will be discussed below, each customer ODU 110 is positioned to receive and transmit user data from and to the base station ODU 107. As discussed above, the customer IDU (not shown) is located within the site 112 and provides a link between the customer's computer systems to the ODU.

As shown in FIG. 1, the cell sites 104 communicate with a communications hub 114 using a communication link or "back haul" 116. The back haul 116 may comprise either a fiber-optic cable, a microwave link or other dedicated high throughput connection. In one embodiment the communications hub 114 provides a data router 118 to interface the wireless communications network with the Internet. In addition, a telephone company switch 120 may connect with the communications hub 114 to provide access to the public telephone network. This provides wireless telephone access to the public telephone network by the customers. Also, the communications hub 114 may provide network management systems 121 and software that control, monitor and manage the communication system 100.

The wireless communication of user data between the base station ODU 107 and customer ODU 110 within a cell 102 is advantageously bidirectional in nature. Information flows in both directions between the base station ODU's 107 and the plurality of Customer ODU's 110. The base station ODU's 107 broadcast single simultaneous high bit-rate channels. In one embodiment, each channel comprises different multiplexed information streams. The information in a stream includes address information which enables a selected Customer ODU 110 to distinguish and extract the information intended for it.

The wireless communication system 100 of FIG. 1 also may provide true "bandwidth-on-demand" to the plurality of Customer ODU 110. Thus, the quality of the services available to customers using the system 100 is variable and selectable. The amount of bandwidth dedicated for a given service is determined by the information rate required by that service. For example, a video conferencing service requires a great deal of bandwidth with a well controlled delivery latency. In contrast, certain types of data services are often idle (which then require zero bandwidth) and are relatively insensitive to delay variations when active. One mechanism for providing an adaptive bandwidth in a wireless communication system, which can be implemented in this system, is described in U.S. Pat. No. 6,016,211, issued on Jan. 18, 2000, the disclosure of which is hereby incorporated by reference in its entirety. In one embodiment, the wireless communication system 100 operates utilizing time division duplexing (TDD) where a channel is time-divided into repetitive time periods or time "slots", but other ways of providing service to multiple customers, such as frequency division duplexing (FDD), may be used in other embodiments.

1. Cell Site

FIG. 2 illustrates a block diagram of the cell site 104 of FIG. 1 used in the wireless communication system 100. As described above, the cell site 104 comprises the base station 106 and the base station ODU 107. As shown in FIG. 2, the base station includes base station indoor units 122 and a back-haul interface, for example back-haul interface equipment 124. The back-haul interface equipment 124 allows the base station to bi-directionally communicate with the hub 114 (FIG. 1).

In one embodiment, the indoor units 122, which may include indoor units 122a, 122b, 122c through 122n, each communicate with a corresponding outdoor unit, which may include outdoor units 108a, 108b, 108c, through 108n, in the ODU 107. Each indoor unit may be associated with a single outdoor unit, but other combinations are available, as previously described above. Each IDU 122(a, b, c, through n) may be connected via a broadband cable 129(a, b, c, through n) to its corresponding base station outdoor unit 108(a, b, c, through n), which, in one embodiment, is mounted on a tower or a pole proximate the base station 106. Each indoor unit 122 sends control messages and user data to its corresponding ODU 108. Each indoor unit 122 also receives response messages and user data from its corresponding base station outdoor unit 108.

The base station 106 is modular in design in one embodiment. The modular design of the base station 106 allows the installation of lower capacity systems that can be upgraded in the field as capacity needs dictate. Each IDU 122 in conjunction with its corresponding ODU 108 performs both the media access protocol layer and the modulation/demodulation functions that facilitate high-speed communication over the wireless link. Each base station outdoor unit 108 may contain high-frequency radio electronics (not shown) and antenna elements for transmitting user data to the customer sites.

2. Indoor Unit

Figure 3:
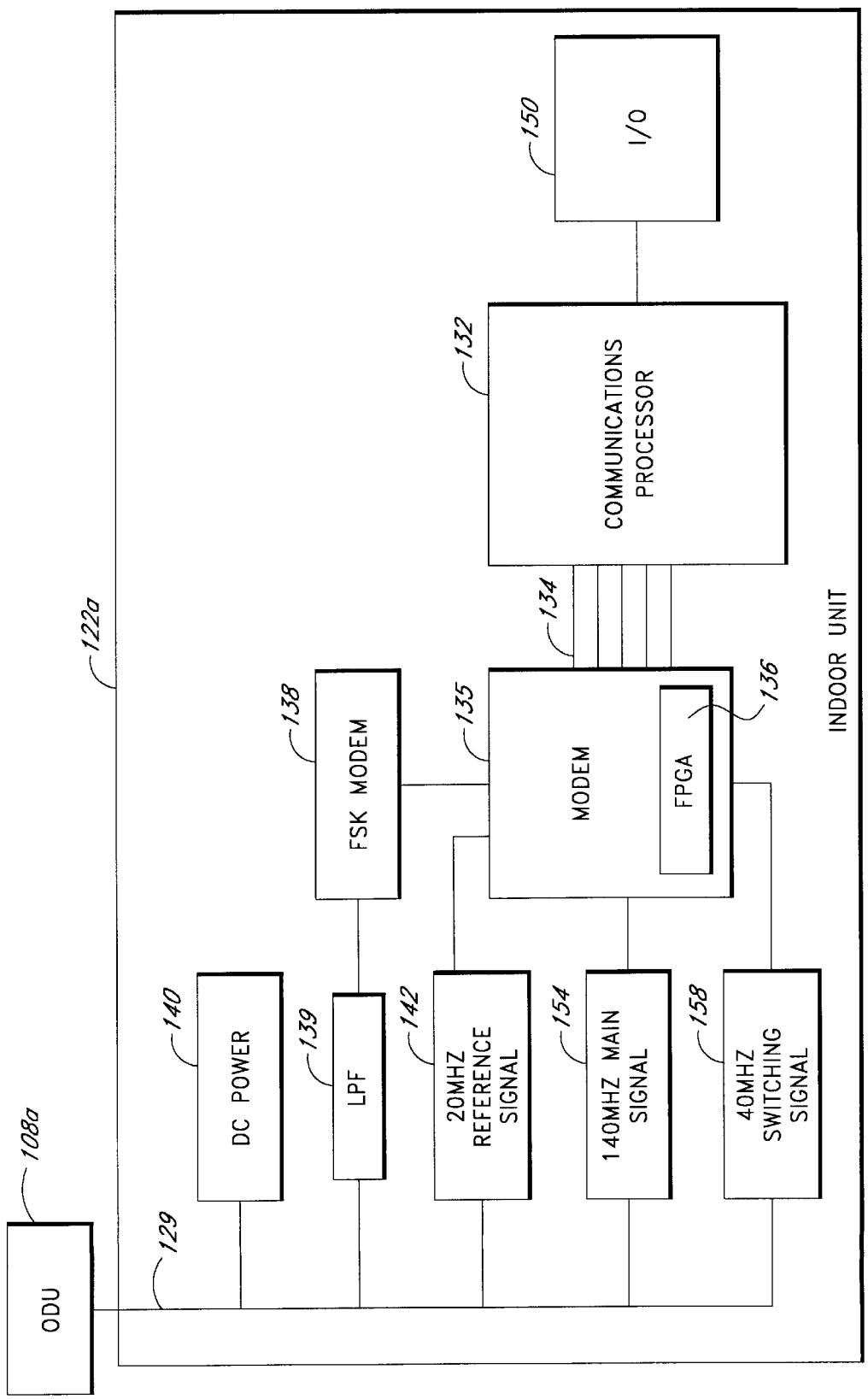
FIG. 3 is a block diagram of an embodiment of an Indoor Unit module from the cell site illustrated in FIG. 2.

Referring to FIG. 3, a more detailed block diagram of one the indoor units 122 (e.g., IDU 122a) is provided. The indoor unit 122 links the back-haul interface 124 (FIG. 2) to a corresponding one of the base station outdoor units 108 (e.g., ODU 108a). For simplicity hereinforward, the indoor unit will be referred to as IDU 122 and the outdoor unit as ODU 108. The IDU 122 may be under the control of a communications processor 132. An exemplary communications processor is a Motorola MPC8260 PowerQUICC II (PQII). As illustrated, the communications processor 132 connects through a PowerPC bus 134 to a modem 135.

The modem 135 includes a Field Programmable Gate Array (FPGA) 136 that stores instructions for controlling other subcomponents of the IDU 122. For example, the FPGA 136 communicates with a Frequency Shift Key (FSK) modem 138 in order to send FSK modulated control messages from the IDU through the broadband cable 129, to the outdoor unit 108. A low band pass filter 139 is provided between the cable 129 and the FSK modem 138. In an alternate embodiment, an Application Specific Integrated Circuit (ASIC) replaces the FPGA in order to provide similar functions.

As is discussed below, the IDU and ODU communicate with one another using messages. The IDU sends control messages to the ODU, and the ODU responds with response messages. This communication allows the IDU to request data from ODU detectors, and then send commands instructing the ODU to reset subcomponents in order to be more efficient.

Thus, control messages are FSK modulated and sent from the IDU to the ODU. Similarly, response messages from the ODU to the IDU are demodulated by the FSK modem 138 and then interpreted by instructions with the FPGA 136. These control messages and response messages, and their data structure and format, are discussed in detail below. In one embodiment, the transmission baud rate of the FSK modem 138 is 115 kbps with one start bit, one stop bit and one parity bit. Of course, other data transfer speeds and formats are contemplated to be within the scope of the invention. Moreover, the FSK modem 138 may transmit and receive in frequencies between 6–8 MHz.

Messages between the IDU and ODU may be transmitted independently of the other signals being passed along the cable 129. In one embodiment, the ODU acts like a slave in that it does not originate messages, but only responds to control messages it receives from the IDU.

As illustrated, power is provided to the ODU through a DC power supply 140 that provides, in one embodiment, 48V DC to the ODU. A 20 MHz reference signal 142 is also transmitted across the cable 129 in order to keep components in the IDU and ODU synchronized with one another.

The communications processor 132 is also linked to an Input/Output port 150 that attaches to the back-haul interface within the base station. The communications processor 132 receives packet data from the Input/Output port 150 and transmits it to the modem 135 for modulation demodulation. The modulated data signal is then placed on a 140 MHz main signal 154 for high throughput transmission to the ODU 108. It should be realized that the data transmission along the 140 MHz main signal can occur simultaneously with the control message and response message data that is Frequency Shift Key modulated across the cable 129.

In order for the IDU and ODU to effectively and rapidly switch between receiving and transmitting data modes, a 40 MHz switching signal 158 is also linked to the communications processor 132 and carried on the cable 129. The 40 MHz switching signal 158 is used within the system to switch the ODU and IDU between transmit and receive modes, as will be discussed below with reference to FIG. 4.

In one embodiment, if the 40 MHz signal is present, the ODU and IDU enter transmit mode to send user data from the base station ODU to customer ODU's. However, if the 40 MHz signal is not present, the ODU and IDU enter receive mode wherein user data being transmitted from other ODU's is received by the base station ODU. The timing of the switching signal is controlled by instructions residing in the FPGA 136. For example, in a half-duplex Time Division Duplex (TDD) architecture, the switching signal 158 is set to switch between receive and transmit modes. However, in a full duplex architecture where user data is constantly being received, the switching signal 158 can be programmed to switch between a transmit mode and a null mode.

3. Outdoor Unit

Figure 4:
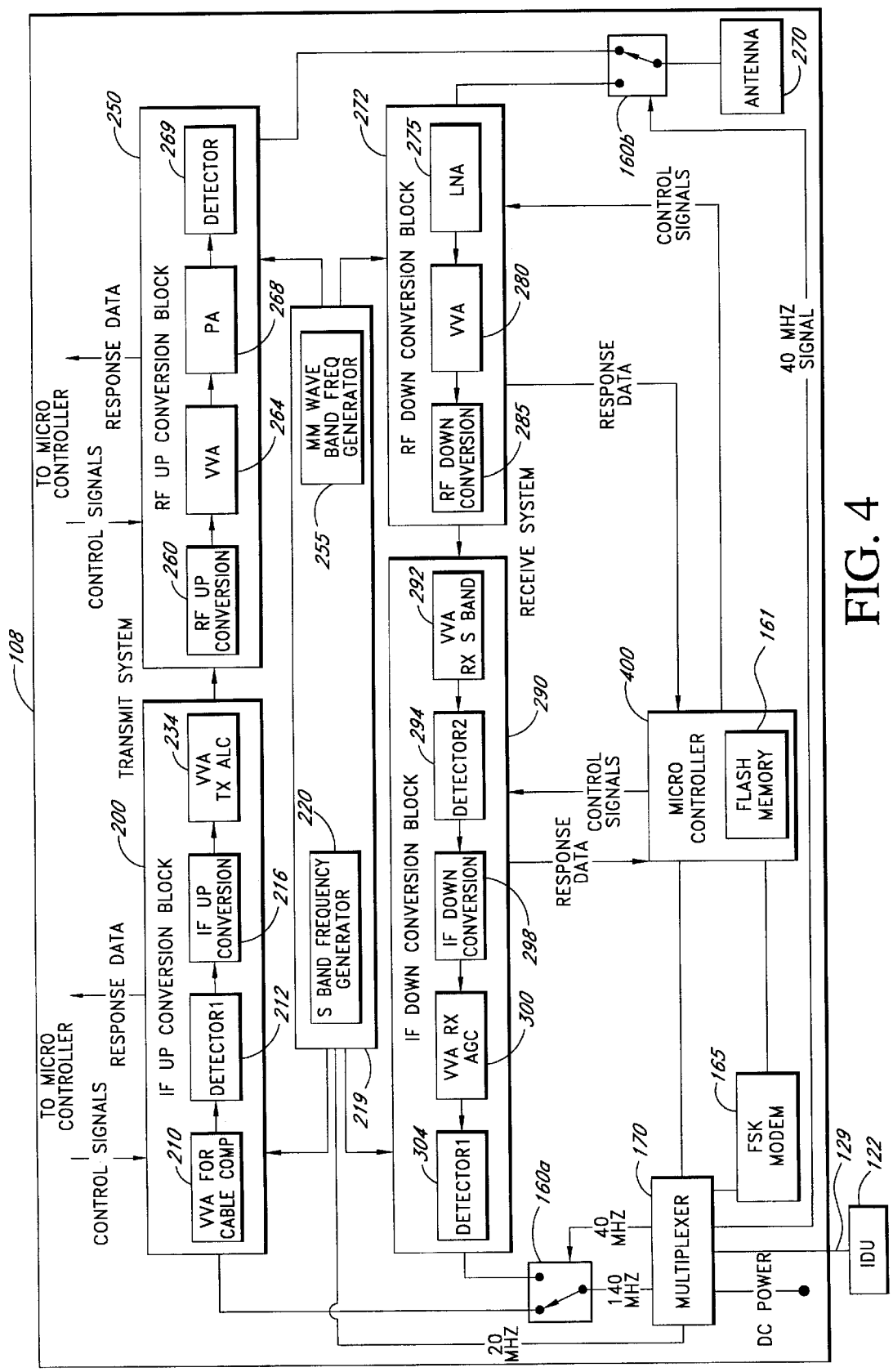
FIG. 4 is a block diagram of an embodiment of an Outdoor Unit module from the cell site illustrated in FIG. 2.

Now referring to FIG. 4, a more detailed block diagram of the outdoor unit 108 is provided. As illustrated, the outdoor unit 108 receives control messages and user data from the IDU 122 across the cable 129. Depending on the state of the 40 MHz switching signal 142 (shown in FIG. 3), a set of switches 160a, 160b in the ODU are either in transmit or receive mode. In transmit mode, user data and control messages are sent from the IDU to the ODU. In receive mode, user data and response messages are sent from the ODU to the IDU. A microcontroller 400 is linked to the components within the ODU in order to manage data flow.

The microcontroller 400 communicates with a multiplexer 170 that separates the signals carried on the cable 129. Within the microcontroller 400 is a programmable memory 161 that stores instructions for gathering the response data and forming response messages for transmission to the IDU. In addition, the instructions within the memory 161 read incoming control messages from the IDU and send control signals to sub-components of the ODU. A FSK modem 165 is connected to the multiplexer 170 and microcontroller 400 for modulating/demodulating messages to/from the IDU.

a. Transmit Mode

If the ODU is in transmit mode, the modulated user data being sent from the IDU along the 140 MHz main signal is first routed through the multiplexer 170 to the switch 160a.

If the switch is set to transmit mode, the main signal is sent to an IF UP CONVERSION block 200 that converts the 140 MHz signal to an approximately 2.56 GHz (S band) signal. As illustrated, the IF UP CONVERSION block 200 first provides a variable voltage attenuator (VVA) 210 that is used to compensate for the fact that attenuation in the cable 129 is length dependent. Since the length is not known in advance, the VVA compensates for cable length variations between one installation and others. The signal then passes to a detector 212 that measures power levels after compensation at the cable input.

Although the following discussion relates to a system that transmits user data within the millimeter wave band at frequencies of approximately 28 GHz, the system is not so limited. Embodiments of the system are designed to transmit user data at frequencies, for example, of 10 GHz to 66 GHz. Alternatively, lower or higher frequencies can be employed.

The user data signal is then up-converted to an S band signal at an IF UP CONVERSION block 216 through an associated local oscillator block 219. The local oscillator block 219 may include an S band frequency generator 220. In one embodiment, the frequency generator 220 includes a National Semiconductor LMX 2301 or Analog Devices ADF41117. The signal is then sent through a second VVA 234 that is used for power adjustment at the S band frequency.

Once the signal has been up-converted to the S band frequency, it is sent to an RF UP CONVERSION block 250. The RF UP CONVERSION block 250 links to a millimeter wave band frequency generator 255 within the local oscillator block 219 for up-converting the 2.56 GHz signal to an approximately 28 GHz signal. The up-converted signal is then passed through a VVA 264 to provide for millimeter wave band power adjustment. Once the signal has been adjusted by the VVA 264 it is sent to a Power Amplifier 268 and then to an output power detector 269. The signal is finally passed through the switch 160b and out an antenna 270.

b. Receive Mode

If the ODU is in receive mode, user data is received in a 28 GHz signal (LMDS band) and passed through the antenna 270 and into an RF DOWN CONVERSION BLOCK 272. Within the RF DOWN CONVERSION BLOCK 272 is a Low Noise Amplifier (LNA) 275 which boosts the received 28 GHz signal. The signal is then sent to a VVA 280 for power adjustment at the millimeter wave band after the LNA 275. The received 28 GHz signal is then sent to a RF down converter 285 for down conversion to a 2.56 GHz (S band) signal. The RF down converter 285 communicates with the Local Oscillator block 219 to reduce the incoming signal to the S band range.

After the received signal has been down converted to 2.56 GHz, it is transmitted to an IF DOWN CONVERSION block 290. Within the IF DOWN CONVERSION BLOCK 290 is a VVA 292 for adjusting the power at the S band prior to down conversion. Following adjustment by the VVA 292, the received signal is passed to a detector 294 for measuring power leakage from the transmission path during signal transmission. The signal is then passed to an IF down converter 298 which uses the local oscillator block 219 to down convert the S band signal to a 140 MHz signal for transmission across the cable 129.

After being converted to a 140 MHz signal, the received user data is passed through another VVA 300 for power adjustment at the low frequency band and then a detector 304 to measuring power levels before transmission across the cable 129.

c. Message Traffic Between the ODU and IDU

It should be realized that the control messages sent by the IDU to the ODU can control components of the ODU. For example, in one embodiment, the controlled components in the ODU are the VVAs and frequency synthesizers. Response messages from the ODU to the IDU are also generated to include data from the detectors, temperature sensor, power sensors or detectors, and other components described above. As can be imagined, control messages are sent by the IDU and then interpreted by the microcontroller in the ODU. After interpreting the message, the microcontroller sends the appropriate adjustment signals to components of the ODU.

The ODU is controlled by the microcontroller 400 (FIG. 4) that manages data flow within the ODU. Control messages from the IDU are sent across the cable 129 to the microcontroller 400 in the ODU and then forwarded to the appropriate ODU component. In addition data signals generated by the ODU components, such as detectors, are sent from the component to the microcontroller 400. The microcontroller 400 builds a response message that is then transmitted via FSK modulation to the IDU, in one embodiment. Further description of the message format and structure, initialization, and operation are provided in U.S. patent application Ser. No. 09/706165, entitled "Communication Interface Between an Indoor Unit and an Outdoor Unit In a Wireless Communication System", filed on Nov. 3, 2000, which is hereby incorporated by reference.

4. Customer Premises Equipment

Although the previous discussion has focused on IDU's and ODU's that are installed as part of a base station, these devices are similarly installed within each customer site for receiving and transmitting wireless data. As described above, the subscribers of the wireless communication system contemplated for use with the present invention may be either residential or business customers. In one embodiment, the CPE 110 includes an ODU, an IDU and a cable between the IDU and ODU.

B. Automated Gain Calibration

1. Cable Compensation

On the base station side of many wireless communication systems such as have been described above, the gain of the receive (and transmit) path is not completely deterministic and not known in advance due mainly to differing amounts of cable length required to connect the roof-top radio or transmitter and antenna to the indoor equipment. Like the transmit path, the receive path must be compensated (calibrated) in some manner to produce a known signal level at various points in the receive chain for optimal performance of the system. This compensation or path calibration can be done by sending a known signal level into the path and adjusting the gain(s) along the path until the signal level measured along the path is at the desired level. This requires some sort of signal generator to produce the signal for this calibration process. However, it can be advantageous to perform the calibration without such a signal generator.

a. First Embodiment

One of the challenges in point-to-multipoint systems is how to calibrate the receive path gain of the Base Station which receives different signals at different time slots, and thus, account for the varying length cable between the IDU and ODU and other factors. In a first embodiment of cable compensation, a method of automatically calibrating the gain of the IDU in an RF/IF distributed system so as to compensate for cable loss is now presented. In one embodiment, some or all of the received signals are operating in a power control closed loop. In one embodiment, the method and system include a combination of two independent processes or algorithms. The first algorithm is an Automatic Level Control (ALC) algorithm and the second algorithm is an automatic gain calibration. This method and system can eliminate the need for any calibration of the receive path prior to installation of the Base Station.

Figure 5:
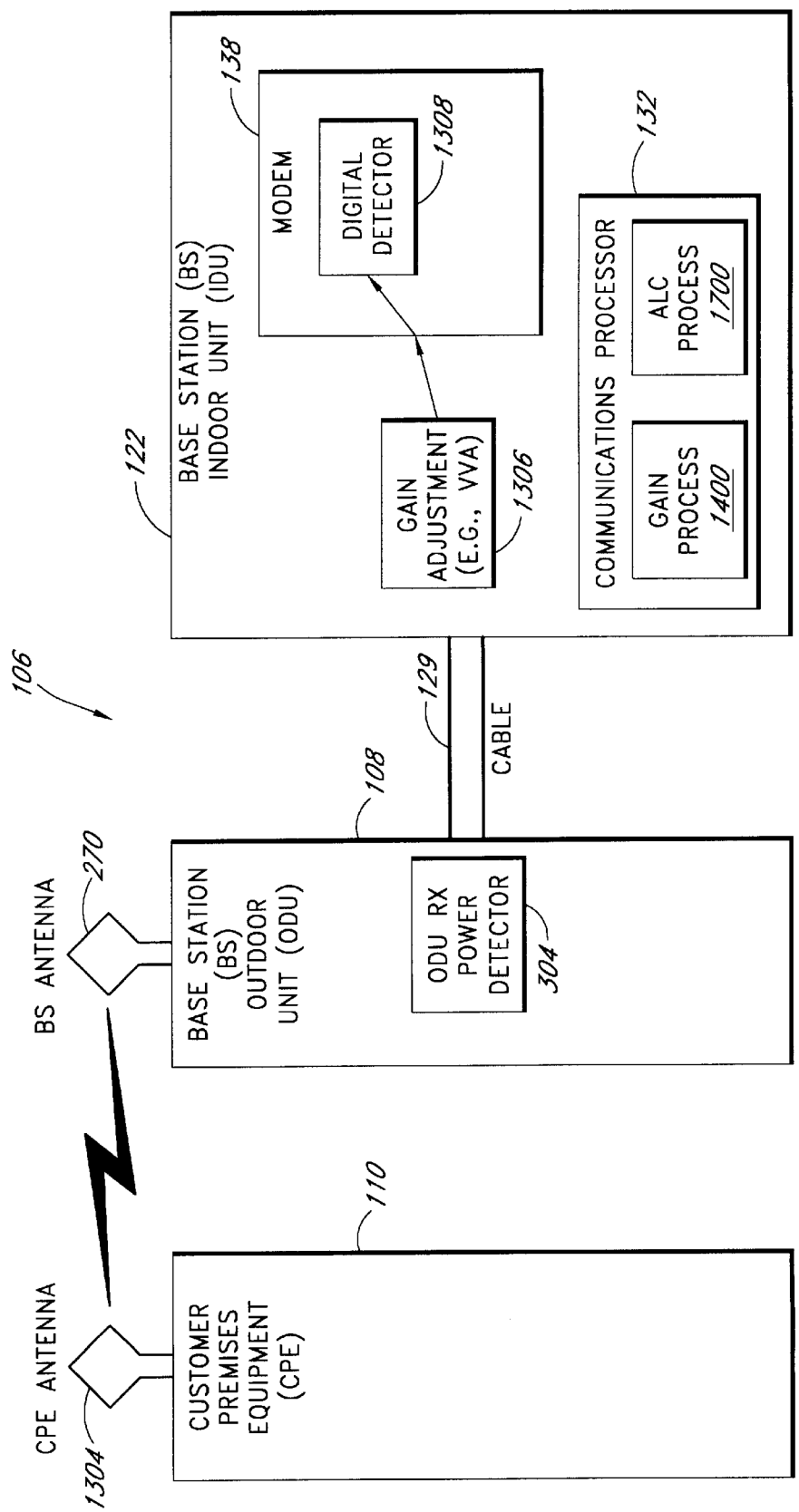
FIG. 5 is a block diagram of the wireless communication system showing exemplary components used by a first cable loss compensation process.

Referring to FIG. 5, a Base Station 106 including an Outdoor Unit 108 (ODU), an Indoor Unit (IDU) 122 and a cable 129 of unknown length connecting them is shown. Only selected components useful for understanding the invention are depicted in this view with a more complete representation of the system having been presented earlier. In one embodiment, the receive gain of the ODU is calibrated, i.e., the receive gain is known and the output level is known for a known input level. Customer Premises Equipment 110 (CPE) having a CPE antenna 1304 communicates, i.e., transmits (Tx) and receives (Rx), with the Base Station having a Base Station antenna 270.

An Automatic Level Control (ALC) process or algorithm is responsible to bring all the CPE's 110 (also referred to as customer sites) to the same received (nominal) level at a digital detector 1308 which is at the input to the modem 138. The digital detector 1308 measures the power at the input to the modem 138. In order for the CPE 110 to reach this nominal level at the input to the modem, the CPE 110 should not be transmitting at maximum power. Software executed by the Base Station 106 has knowledge if there is a CPE 110 which is not transmitting at maximum power, and will be further described below.

The purpose of the present automatic gain calibration algorithm is to adjust the gain in the IDU 122 at the gain adjuster 1306, e.g., a VVA, such that a total cable loss is compensated. When the IDU gain is perfectly compensating for the cable loss, then the ALC algorithm adjusts the transmitter power of the CPE's 110 such that they will be received at a nominal level at the output of the ODU 108, which is at the ODU Rx power detector 304.

The method of automatically calibrating the gain of the IDU includes an automatic gain algorithm 1400 (FIG. 6) that adjusts the gain in the IDU 122 to compensate for different cable loss and other gain variations in the IDU up to the receiver (modem 138). In one embodiment, the automatic gain algorithm 1400 is performed by the Base Station IDU communications processor 132 that can be implemented for example as software, firmware or in a suitably configured application specific integrated circuit (ASIC). The gain algorithm 1400 relies on the fact that the Base Station 106 controls the transmitter power of each of the CPE's 110 in a closed loop (via a request to the CPE's) using an Automatic Level Control (ALC) process. In one embodiment, the ALC algorithm is performed under the control of the IDU communications processor 132 of the Base Station 106. The ALC algorithm is implemented by measuring the power of the CPE signals received by the Base Station modem 138, and then the Base Station sends messages to request each CPE 110 to change the CPE transmit power as necessary to the nominal level, except for those CPE's that have reached maximum power. In other words, as long as a CPE 110 does not reach its maximum power, the Base Station 106 keeps the signal level at the modem input at a constant level. One embodiment of the ALC process will be further described in conjunction with FIG. 9 below.

Figure 6:
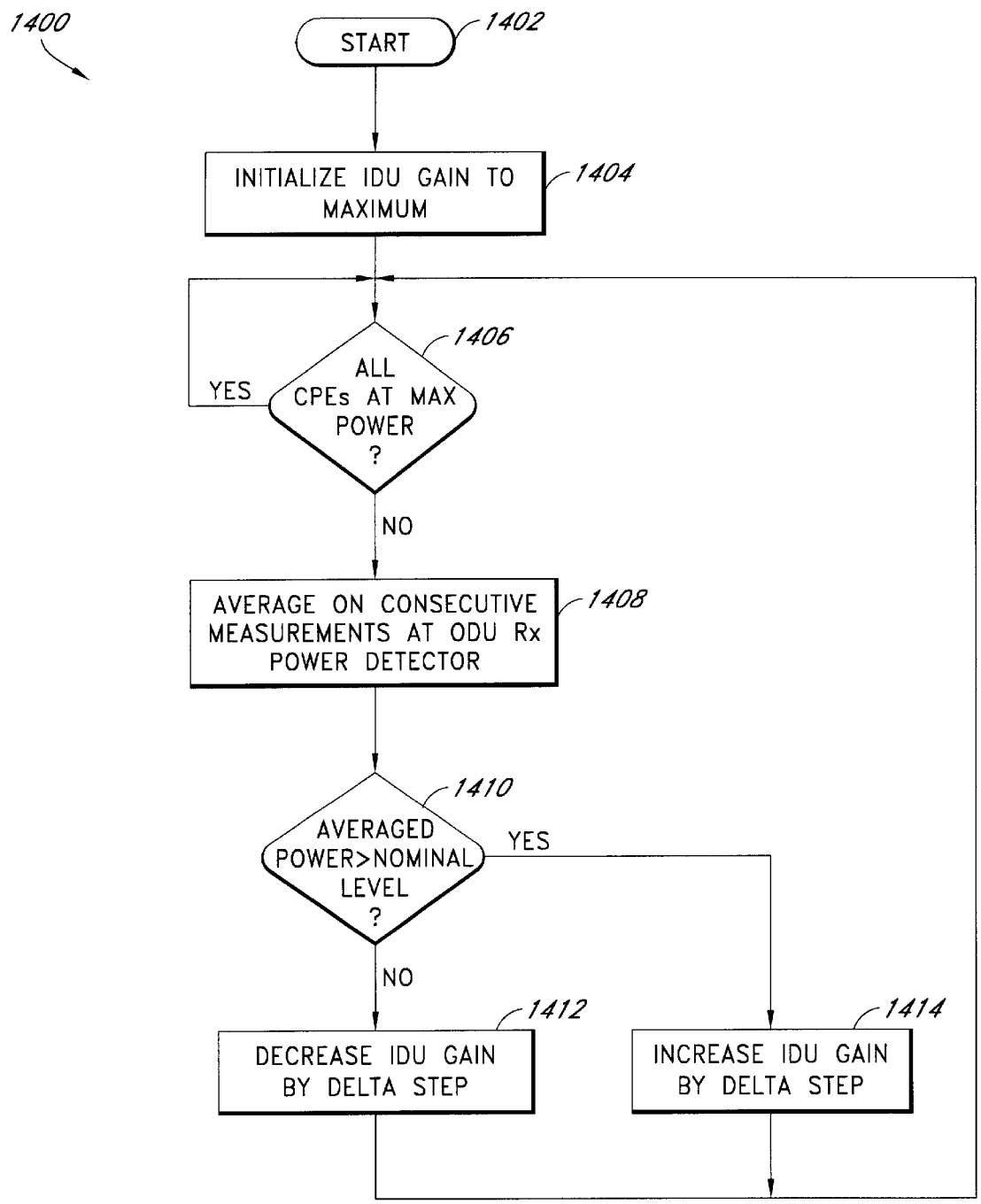
FIG. 6 is a flowchart of one embodiment of the first cable loss compensation process performed by the wireless communication system.

Referring to FIG. 6 and also to FIG. 5, the present algorithm or process 1400 used for adjusting the gain of the IDU 122 of the Base Station 106 will be described. Beginning at a start state 1402, process 1400 proceeds to state 1404 and initializes the IDU gain at the gain adjuster 1306 to a predetermined maximum value. The initialization may be performed via a control signal from the communications processor 132 to the gain adjustment 1306. In one embodiment, the predetermined maximum value may be initialized to a value from a range 0 dB to 25 dB. Advancing to a decision state 1406, process 1400 determines if all the CPE's 110 are at maximum power. A CPE determines that it has reached maximum power when the gain of the ODU of the CPE reaches a maximum value or when the ODU of the CPE determines that the power is too high at the output. In one embodiment, process 1400 determines if a CPE is operating at maximum power by checking if a "max power" status or condition exists for that CPE, which may be provided by an Automatic Level Control process 1700. The CPE may indicate this power status via a portion of an acknowledgement message to the Base Station. The Automatic Level Control process 1700 will be further described in conjunction with FIG. 9. In another embodiment, the power status may be monitored by an operation or function separately from the ALC process 1700.

If it is determined at state 1406 that the CPE's 110 are at maximum power, process 1400 continues by looping at decision state 1406 until there is at least one CPE 110 that is not at maximum power. This can be implemented by periodically monitoring the CPE power levels. A particular CPE may reach maximum power and then reduce power based on link conditions. For example, under rain or fade conditions, the CPE might reach maximum power and then, as soon as the rain stops or the fade disappears, the Base Station 106 requests the CPE to reduce power.

When there is at least one CPE 110 that is not at maximum power, process 1400 proceeds to state 1408 where the maximum power at the output of the ODU 108 is measured (e.g., by the ODU Rx Power Detector 304, in one embodiment) and averaged. Various averaging schemes may be utilized. One exemplary scheme involves collecting measurements from the ODU Rx Power Detector 304 over a period of time not shorter than ten seconds, and then averaging the one hundred highest values to derive an averaged power. Advancing to a decision state 1410, the averaged power is compared to a nominal level. The nominal level is based on the known receive gain of the ODU 108, and in one embodiment, the nominal level may be in the range of 3 to 5 dBm. In the case where the measured maximum power is below the nominal level, the IDU gain is decreased at state 1412, such as by a control signal from the communications processor 132 to the gain adjustment 1306, and the ALC requests the CPE's 110 to increase their transmitted power. In one embodiment, the IDU gain adjustment 1306 is performed by a Variable Voltage Attenuator (VVA) by a minimum delta step value, such as 0.2 dB or another appropriate delta step value, such as for example, a value selected from a range of 0.1 dB to 0.4 dB. In the case where the measured maximum power is above the nominal level, the IDU gain is increased at state 1414, such as by a control signal from the communications processor 132 to the gain adjustment 1306, and the ALC requests the CPE's 110 to decrease their transmitted power. At the completion of state 1412 or 1414, process 1400 moves back to decision state 1406 to determine if all the CPE's 110 are at maximum power, as described above. Eventually, the ALC in conjunction with the process 1400 calibrates the IDU gain to compensate for the cable loss and other gain variations in the IDU 122.

The above states in FIG. 6 are used to initially perform cable compensation at the Base Station 106. However, the process 1400 can continue to run to account for and handle changing conditions of cable loss due to aging and temperature changes.

b. Second Embodiment

Figure 7:
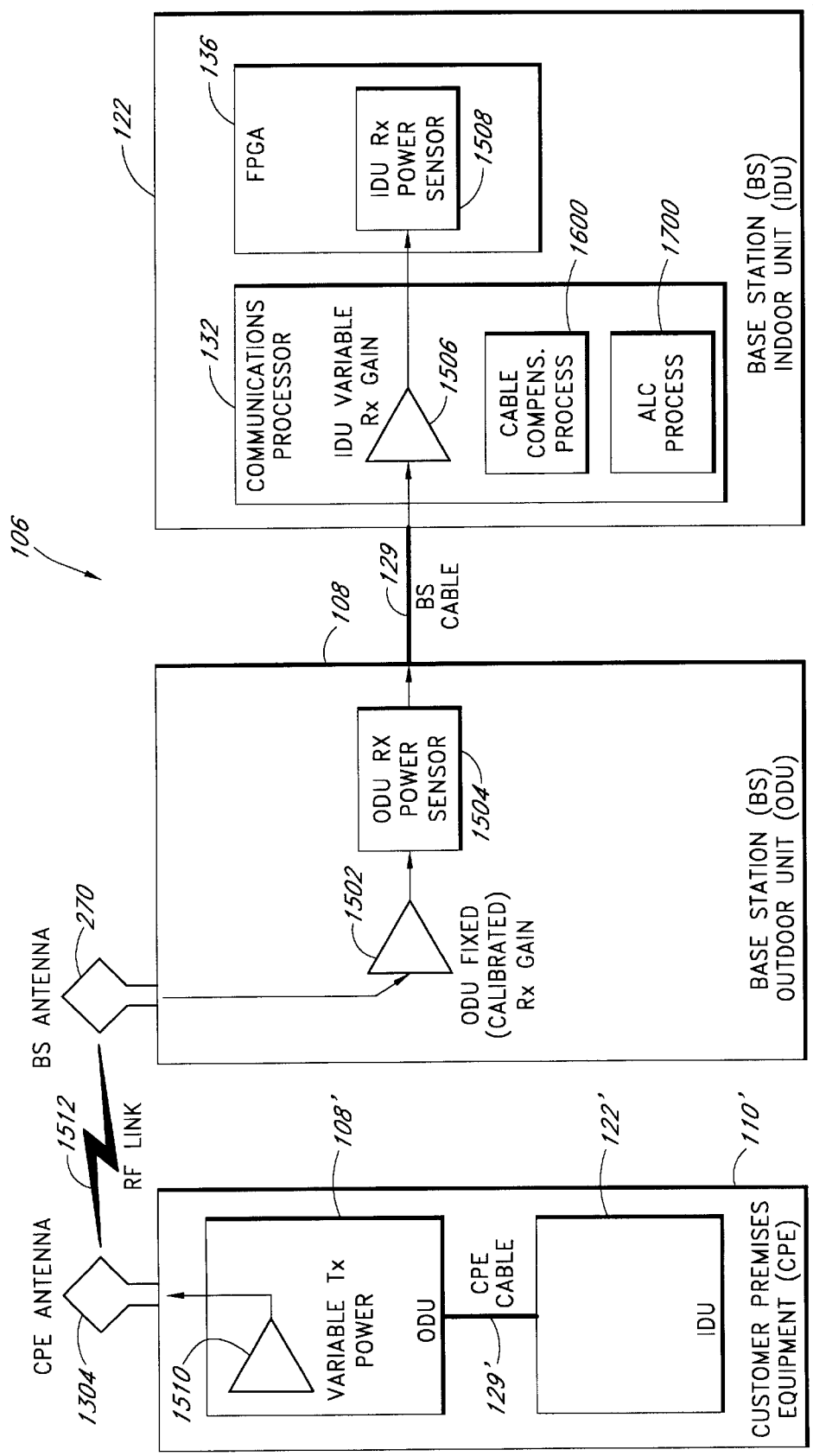
FIG. 7 is a block diagram of the wireless communication system showing exemplary components used by a second cable loss compensation process.

Referring to FIG. 7, another embodiment of the cable compensation method utilizes Subscriber Equipment or CPE 110' and the Base Station 106, including the Outdoor Unit 108 (ODU), the Indoor Unit (IDU) 122 and the cable 129 of unknown length, e.g., such as up to or exceeding 1000 feet, connecting them. Only selected components useful for understanding the invention are depicted in this view with a more complete representation of the system having been presented earlier. In one embodiment, the receive gain of the Base Station ODU 108 is calibrated, i.e., the receive gain is known and the output level is known for a known input level. Customer Premises Equipment 110' (CPE) can have an IDU 122', a CPE cable 129' from the IDU 122' to an ODU 108' and the CPE antenna 1304. The CPE ODU 108' includes a variable Tx power component 1510, which may be implemented by one or more of the VVA's 210, 234 and/or 264 of FIG. 4, that feeds the CPE antenna 1304.

The CPE 110' communicates, i.e., transmits (Tx) and receives (Rx), via a wireless radio frequency (RF) link 1512 with the Base Station 106 having the Base Station antenna 270. The Base Station antenna 270 provides a signal received from the CPE 110' to an ODU fixed (calibrated) Rx gain component 1502. The signal includes the user data stream and may include messages from the CPE 110', which may include the power status of the CPE. The output of the ODU Rx gain component 1502 feeds an ODU Rx power sensor 1504 which subsequently connects to the Base Station cable 129. The ODU Rx power sensor 1504 may be implemented by the detector 304 (FIG. 4). The Base Station ODU 108 provides response messages including Base Station ODU Rx power readings to the IDU via the Base Station cable 129, an IDU variable Rx gain component 1506 and an IDU Rx power sensor 1508. The gain component 1506 is a VVA and in one embodiment, is part of the communications processor 132, which has been previously described in conjunction with FIG. 3. In another embodiment, any suitable controllable gain/attenuator may be utilized. The IDU Rx power sensor 1508 may be part of the FPGA 136, which has also been previously described in conjunction with FIG. 3.

Figure 8:
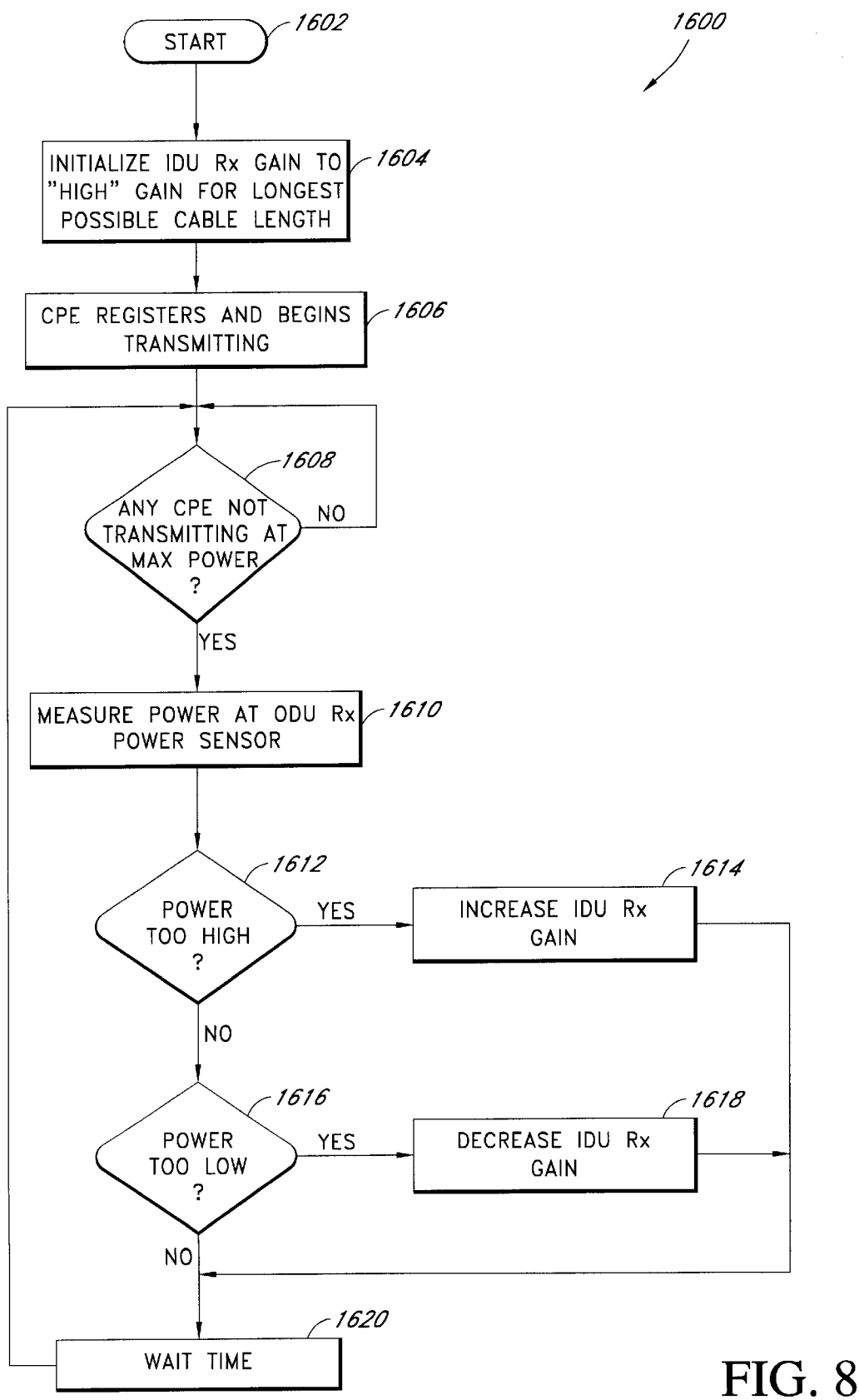
FIG. 8 is a flowchart of one embodiment of the second cable loss compensation process performed by the wireless communication system.

Referring to FIG. 8 and also to FIG. 7, a present Cable Compensation Via Gain Adjustment algorithm or process 1600 will be described. In one embodiment, the Cable Compensation process 1600 is performed by the Base Station IDU communications processor 132 that can be implemented, for example, as software, firmware or in a suitably configured ASIC. Beginning at a start state 1602, process 1600 proceeds to state 1604 and initializes the IDU Rx gain at the IDU variable Rx gain component 1506 to a predetermined maximum value, such as for the longest possible cable length, which, in one embodiment, is one thousand feet. The initialization may be performed via a control signal from the communications processor 132 to the IDU Rx gain component 1506. In one embodiment, the predetermined maximum value may be initialized to a value in a value range 900 to 1000 for a one thousand foot cable 129. After the Base Station 106 is installed and commissioned, it will begin with an un-calibrated Rx path in which the gain value for the receive path is unknown and initially set to some reasonable, but completely un-calibrated value. The process 1600 remains at state 1604 until a first CPE attempts to register with the Base Station and receive service at state 1606. Due to the dynamic range of the wireless communication system, the un-calibrated Rx path does not prevent the CPE from establishing service, although the quality of the airlink may be far from optimal with an un-calibrated system. Once the CPE 110' has registered and is transmitting towards the Base Station 106, the Base Station has a signal source that it can use to calibrate its receive path.

Advancing to a decision state 1608, process 1600 determines if any CPE 110' is not operating at maximum power. If not, process 1600 continues by looping at decision state 1608 until the decision state determines that a CPE is not transmitting at maximum power. In one embodiment, process 1600 determines if the CPE is operating at maximum power by checking if a "max power" status or condition exists, which may be provided by the Automatic Level Control process 1700. The CPE may indicate this power status via a portion of an acknowledgement message to the Base Station. The Automatic Level Control process 1700 will be further described in conjunction with FIG. 9. In another embodiment, the power status may be monitored by an operation or function separately from the ALC process 1700.

When a CPE is not operating at maximum power, as determined by decision state 1608, process 1600 proceeds to state 1610 where the power at the output of the ODU 108 is measured (e.g., by a request from the communications processor 132 to the ODU Rx power sensor 1504 via the use of messages as described earlier). Advancing to a decision state 1612, process 1600 determines if the power is too high. The power sensor 1504 is calibrated such that it produces a known value when it senses the desired power, so that the process 1600 compares the read value to see if it is higher (or lower for a decision state 1616) than the desired value. If the power is too high, the IDU Rx gain is increased at state 1614 at the IDU Rx gain component 1506. The increased gain at the IDU Rx gain component 1506 causes the ALC process 1700 (FIG. 9) to react more rapidly (e.g., at states 1708 and 1710) due to the synergistic interaction of process 1600 and ALC process 1700 to achieve the desired cable compensation. In one embodiment, the increased gain at the IDU Rx gain component 1506 causes the process 1700 to request the CPE to decrease the CPE ODU Tx power (at state 1710) by a greater amount than if the gain was not increased at gain component 1506.

If the ODU power is not too high, as determined at decision state 1612, process 1600 continues at the decision state 1616 to determine if the power is too low (in a manner similar to that done in determining if the power is too high). If the power is too low, the IDU Rx gain is decreased at state 1618 at the IDU Rx gain component 1506. The decreased gain at the IDU Rx gain component 1506 causes the ALC process 1700 (FIG. 9) to react more rapidly (e.g., at states 1712 and 1714) due to the synergistic interaction of process 1600 and ALC process 1700. The decreased gain at the IDU Rx gain component 1506 causes the process 1700 to request the CPE to increase the CPE ODU Tx power (at state 1714) by a greater amount than if the gain was not decreased at gain component 1506.

If the ODU power is not too low, as determined at decision state 1616, or at the completion of either state 1614 or state 1618, process 1600 advances to state 1620 and waits for an amount of time. The process 1600 waits until another transmission from a CPE so that there is a new reading on the Rx power sensor 1504. After the wait time at state 1620, process 1600 moves back to the decision state 1608 to determine if the CPE is at maximum power, as described above. Thus, the Base Station 106 measures the received signal at appropriate points along its path and adjusts its gain accordingly to achieve the optimal signal level.

The above states in FIG. 8 are used to initially perform cable compensation at the Base Station 106. However, the process 1600 can continue to run to account for and handle changing conditions.

Figure 9:
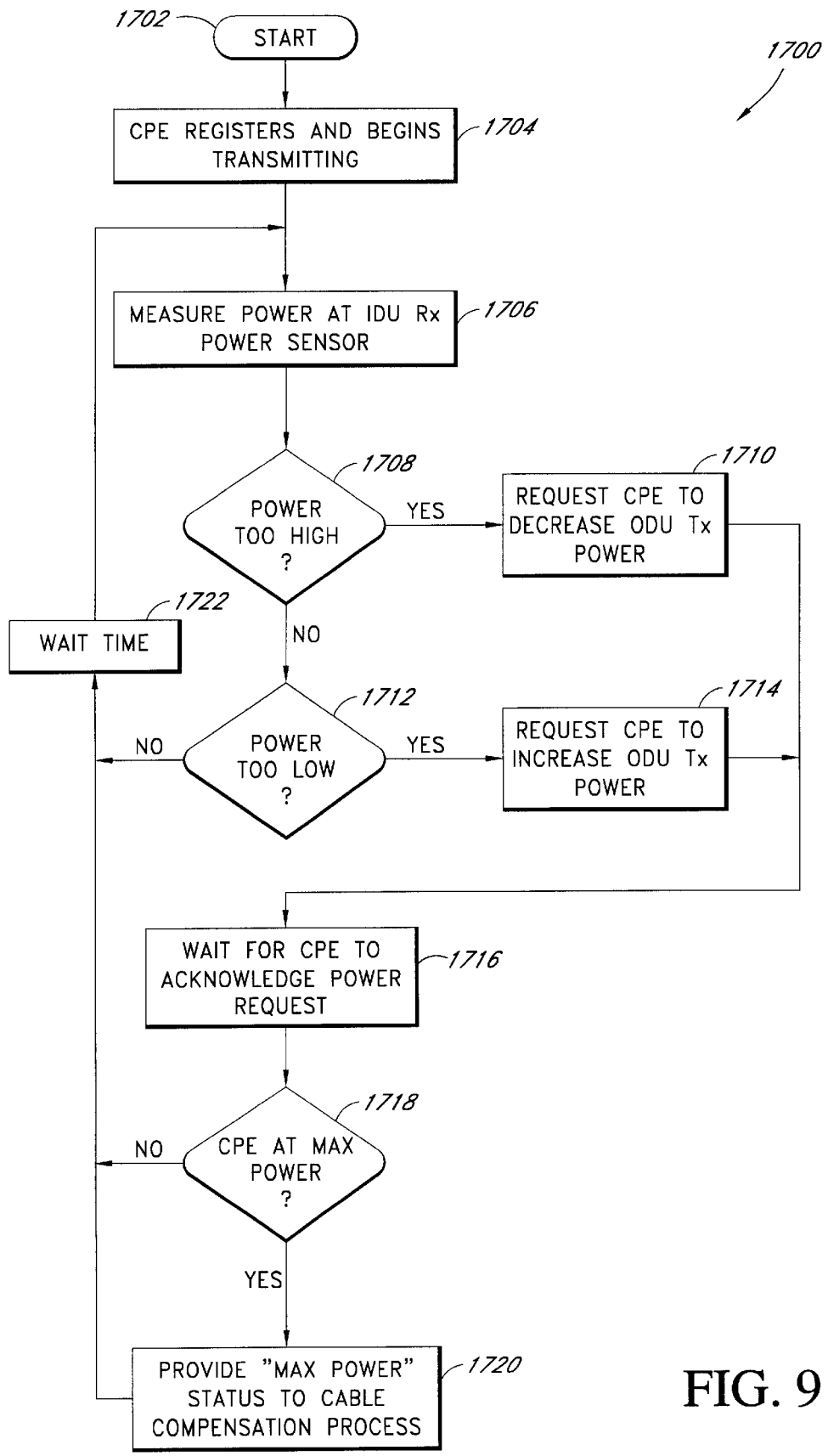
FIG. 9 is a flowchart of one embodiment of an automatic level control process performed in conjunction with the cable loss compensation processes by the wireless communication system.

Referring to FIG. 9 and also to FIG. 7, the Automatic Level Control (ALC) process 1700 will be described. In one embodiment, the ALC process 1700 is under the control of the Base Station IDU communications processor 132 that can be implemented, for example, as software, firmware or in a suitably configured ASIC. Beginning at a start state 1702, process 1700 proceeds to state 1704 where a CPE attempts to register with the Base Station and begins transmitting to the Base Station 106. Advancing to state 1706, process 1700 determines the power at the Base Station IDU 122 (e.g., from a reading of the IDU Rx Power Sensor 1508). Advancing to a decision state 1708, process 1700 determines if the power is too high in a manner that may be similar to that done at decision state 1612 (FIG. 8). If the power is too high, process 1700 requests the CPE to decrease the CPE ODU Tx power at state 1710. The amount of the requested decrease can depend on the magnitude of the difference between the power determined at the Base Station IDU and the desired power. The amount of the CPE ODU Tx power reduction is related to the increase in the Base Station IDU Rx gain performed at state 1614 (FIG. 8), as described above. The CPE ODU Tx power is adjusted at the Tx power component 1510 by the CPE 110' in response to a request from the communications processor 132 over the RF link 1512 to the CPE 110'.

If the power measured at state 1706 is not too high, as determined at decision state 1708, process 1700 continues at a decision state 1712 to determine if the power is too low. If so, process 1700 requests the CPE to increase the CPE ODU Tx power at state 1714 in a manner similar to that done at state 1710. The amount of the requested increase can depend on the magnitude of the difference between the power determined at the Base Station IDU and the desired power. The amount of the CPE ODU Tx power increase is related to the decrease in the Base Station IDU Rx gain performed at state 1618 (FIG. 8). If the power is not too low, as determined at decision state 1712, process 1700 proceeds to state 1722 and waits for an amount of time. Process 1700 waits for the CPE to receive the request, acknowledge it and change its transmit power. After the wait time at state 1722, process 1700 moves back to state 1706 to measure the power at the IDU 122, as described above.

At the completion of either state 1710 or state 1714, process 1700 advances to state 1716 and waits for the CPE to acknowledge the power request of either state 1710 (decrease power) or state 1714 (increase power) via an acknowledgement message to the Base Station over the link 1512. After the CPE acknowledges the power request at state 1716, process 1700 then continues to a decision state 1718 and determines if the CPE is operating at maximum power. The CPE 110' indicates this status via a field in the acknowledgment message. If so, process 1700 proceeds to state 1720 and provides the "max power" status to the cable compensation process 1600 (FIG. 8), as mentioned above. In another embodiment, states 1718 and 1720 may be performed separately from the ALC process 1700 in another operation or function. At the completion of providing the status at state 1720, or if is determined that the CPE is not operating at maximum power at state 1718, process moves to state 1722 and waits at state 1722, as described above.

The above states in FIG. 9 are used to perform automatic level control on each CPE 110'. The ALC process 1700 can continue to run until there are no transmitting CPE's, e.g., process 1700 may terminate if all the CPE's leave the system 100, but restarts once a CPE begins transmitting again.

Such a cable compensation scheme can have several advantages. The advantages may include: no external equipment and no extra internal base station hardware are required; the receive path does not need to be calibrated during installation or even before commissioning; the Base Station can be recalibrated during operation without interrupting service and without someone being physically present at the Base Station; and the processes are completely automatic (no human intervention needed).

2. Improved Transmit Power Control

In one embodiment of the existing Base Station ODU transmit section 200, 250 (FIG. 4), which may be referred to as the ODU transmitter, the output power stability may be directly affected by the gain of the transmitter circuits. The gain of the transmitter circuits, particularly millimeter wave monolithic microwave integrated circuits (MMICs), drift considerably with temperature, where as much as a 10 dB of gain variation has been seen over a −30 to +70 degrees Celsius operating temperature range. The transmit power should be as high as possible to optimize range but not so high as to cause excessive signal distortion. In short, there is an optimum transmit power that it is desirable to operate at under all conditions. What is desired is to provide for a fixed headroom amount between peak power of the modulated signal and the peak power capability of the system regardless of modulation type.

Closed loop power control may be applied to compensate for the gain changes in the transmitter over temperature and frequency. An output power detector is used to sense the transmit power and a VVA is used to adjust the transmit (Tx) gain to maintain a fixed level at the detector. This by itself is a standard way of stabilizing the Tx output power.

However, a standard detector circuit only measures the average power of the transmitted signal. The performance of a Power amplifier (PA), such as PA 268 (FIG. 4), is limited not by its average power handling capability, but by its peak power handling capability. It is desirable to maintain the same transmitted peak power regardless of modulation type, e.g., QPSK, QAM16 or QAM64, so that, in all cases, distortion at the peaks of the transmitted envelope is the same. Due to the way in which the modem generates each of these modulation types, the peak power is the same for each type (i.e., the outer four corner points in the constellation remain fixed). A conventional diode detector produces different detected outputs for each modulation type as it typically produces a voltage proportional to the average power, and the average power of each modulation type is different. Hence, if a conventional detector is used inside a conventional ALC loop, the loop will try to hold the average power constant, but it will not hold the peak power constant.

Figure 10A:
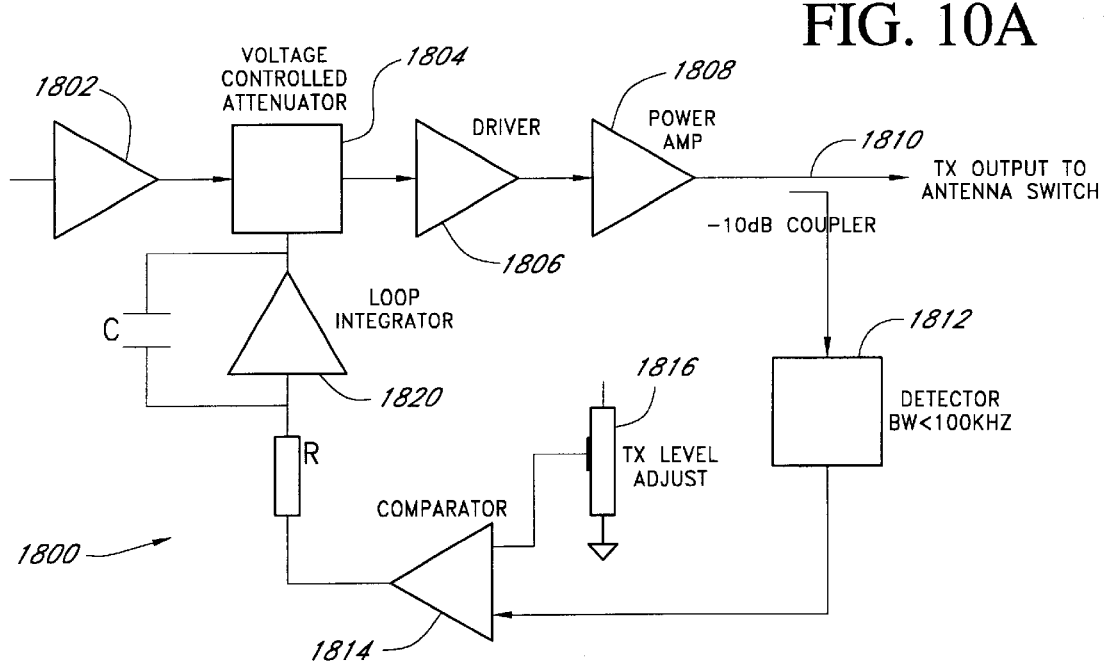
FIG. 10A is a block diagram of an automatic transmit power control circuit.

Referring to FIG. 10A, an implementation of a transmitter Automatic Level Control (ALC) circuit or subsystem 1800 will now be described. A sample (such as via a −10 dB coupler) of the Tx output 1810 is fed to a detector 1812, where the detector 1812 has a bandwidth of, for example, less than 100 kHz. The detector output feeds a comparator 1814 which compares the detector output to a preset level (e.g., provided by a Tx level adjust circuit 1816) and the error signal is fed to a loop integrator 1820. The output of the loop integrator 1820 adjusts a voltage controlled attenuator 1804 in the Tx signal path to bring the detector 1812 output voltage equal to the Tx level adjust 1816 setting. In this way, the Tx level adjust 1816 controls the Tx output power and the loop (components 1804 through 1820) absorbs changes in drive level or amplifier gains, e.g., by driver 1806 and/or power amplifier 1808. Accuracy of the power level of output 1810 is controlled primarily by the performance of the detector 1812.

However, there are significant drawbacks to this circuit 1800 when it is used in an adaptive modulation environment. The detector 1812 is typically a low bandwidth circuit that yields an output voltage proportional to the average power of the Tx output 1810. The Transmitter PA 1808 is limited by its ability to handle the peak power of the transmitted waveform. Clipping of the envelope causes significant distortion and must be avoided. The peak to average ratio is different for QPSK, QAM16 and QAM64, which are the modulation schemes used in the present wireless communication system 100. That is, the relationship between the peak power of the signal and the detected voltage are different for each modulation type.

Because the above-described loop adjusts to hold the average power constant, the peak power varies considerably with different modulation types and may result in clipping when transmitting via QAM64 modulation. The circuit 1800 will be unable to hold the optimum Tx power level, i.e., maintain a fixed overhead or headroom between the peak power of the signal envelope and the peak power handling capability of the amplifier. For example, if the ALC circuit 1800 is optimized for QPSK modulation, there will be distortion on the output signal when QAM16 modulation or QAM64 modulation are used for transmission. If the ALC circuit 1800 is optimized for QAM64 modulation, there will be wasted transmitter power when QPSK modulation or QAM16 modulation are used.

In terms of the Tx signal constellation, i.e., the set of signals geometrically represented in the form of a set of vectors, it is desirable to hold the amplitude of the outer four corner points of the constellation constant, regardless of modulation type as generated by the Tx modulator.

Figure 11:
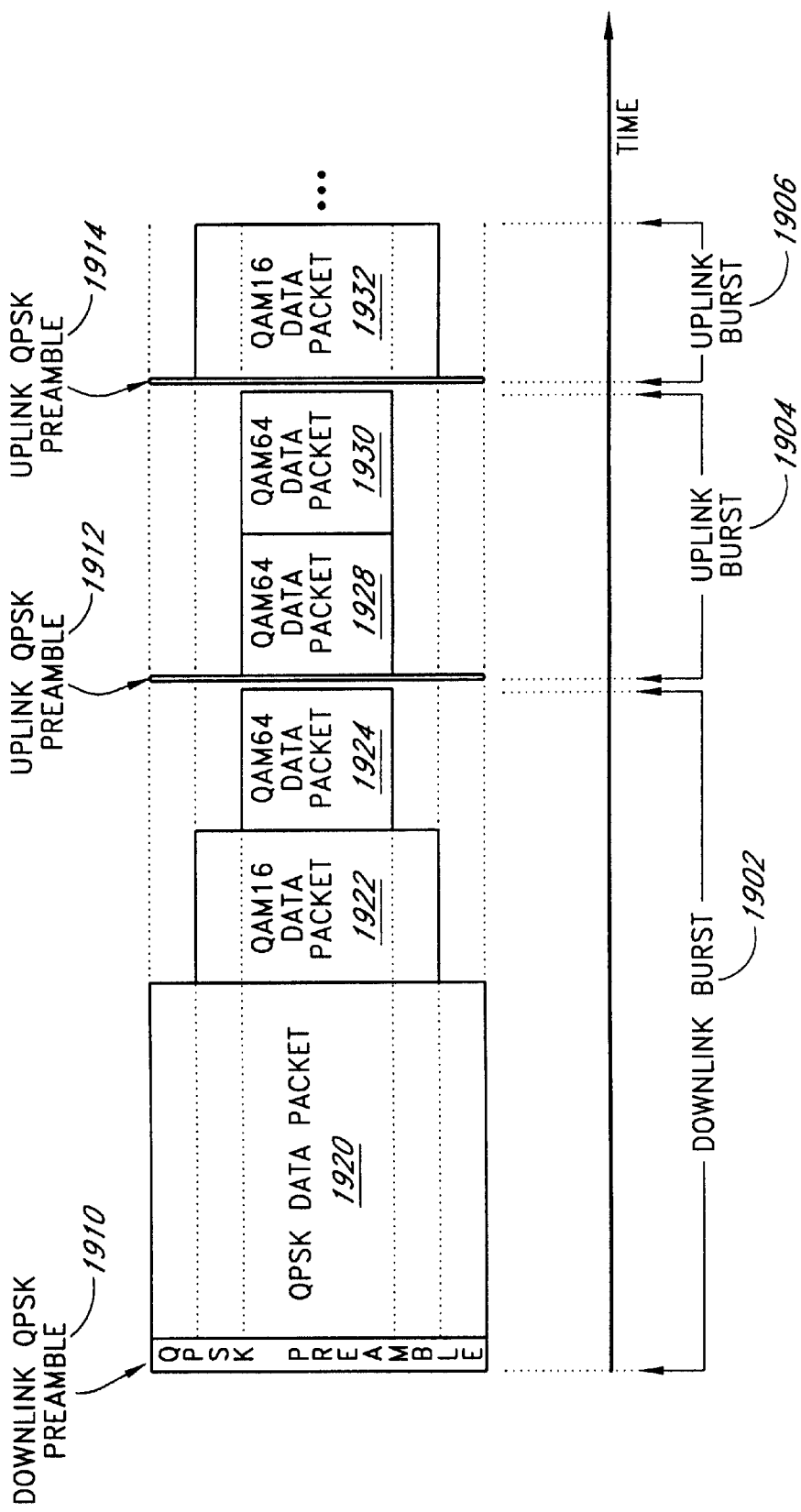
FIG. 11 is a diagram of several exemplary bursts in a portion of a frame such as used by the wireless communication system of FIG. 1.

The IF signals transmitted along both directions of the cable between the IDU and the ODU consist of bursts of modulated data that may use quadrature phase-shift keying (QPSK), 16-point constellation quadrature amplitude modulation (QAM16) and/or 64-point constellation quadrature amplitude modulation (QAM64). Referring to FIG. 11, several exemplary bursts 1902, 1904, 1906 of a portion of a frame are shown. The frame is time-divided into repetitive time periods or time "slots" utilizing time division duplexing (TDD), but other ways of providing service to multiple customers, such as frequency division duplexing (FDD), may be used in other embodiments. A burst is a set of packets where the first packet is a preamble and the other packets are data packets. The preamble includes information as to the number of data packets in the burst. In one embodiment, each burst contains a short QPSK preamble (e.g., 1910, 1912, 1914). For example, the downlink QPSK preamble 1910 may be 15 microseconds long and the uplink QPSK preamble (1912, 1914) may be about 1.2 microseconds long. For a downlink burst (e.g., burst 1902), each data packet after the preamble may go to a different CPE, and each data packet may use a different modulation type (e.g., QPSK packet 1920, QAM16 packet 1922, QAM64 packet 1924, and as indicated by the dashed lines) as needed by a particular CPE. Each downlink burst does not necessarily have data packets of all modulation types. In other embodiments, other modulation types and/or different ordering of the data packets may be used. In one embodiment, the data packets (for different modulation types) carry the same number of data bits, but are of different lengths depending on the modulation type. For example, a QAM16 data packet is about one-half the length of a QPSK data packet and a QAM64 data packet is about one-third the length of a QPSK data packet. Data packets in the uplink bursts (e.g., bursts 1904, 1906) utilize the modulation type (for example, QAM64 (1928, 1930), or QAM16 (1932)) associated with a particular CPE that is sending the packets.

The following describes a closed loop method of transmitter power control that is not affected by modulation type, e.g., QPSK, QAM16 and QAM64. This may be accomplished by detecting and maintaining the amplitude of the QPSK preamble (e.g., 1910) that the Base Station transmits at the beginning of every transmitted burst. This requires a high bandwidth detector, and a gated sample and hold (S/H) circuit that captures the detected voltage during the preamble. In this way, the transmit peak power is held constant, at the desired level, regardless of modulation type and changes in transmit chain gain over temperature.

Figure 12:
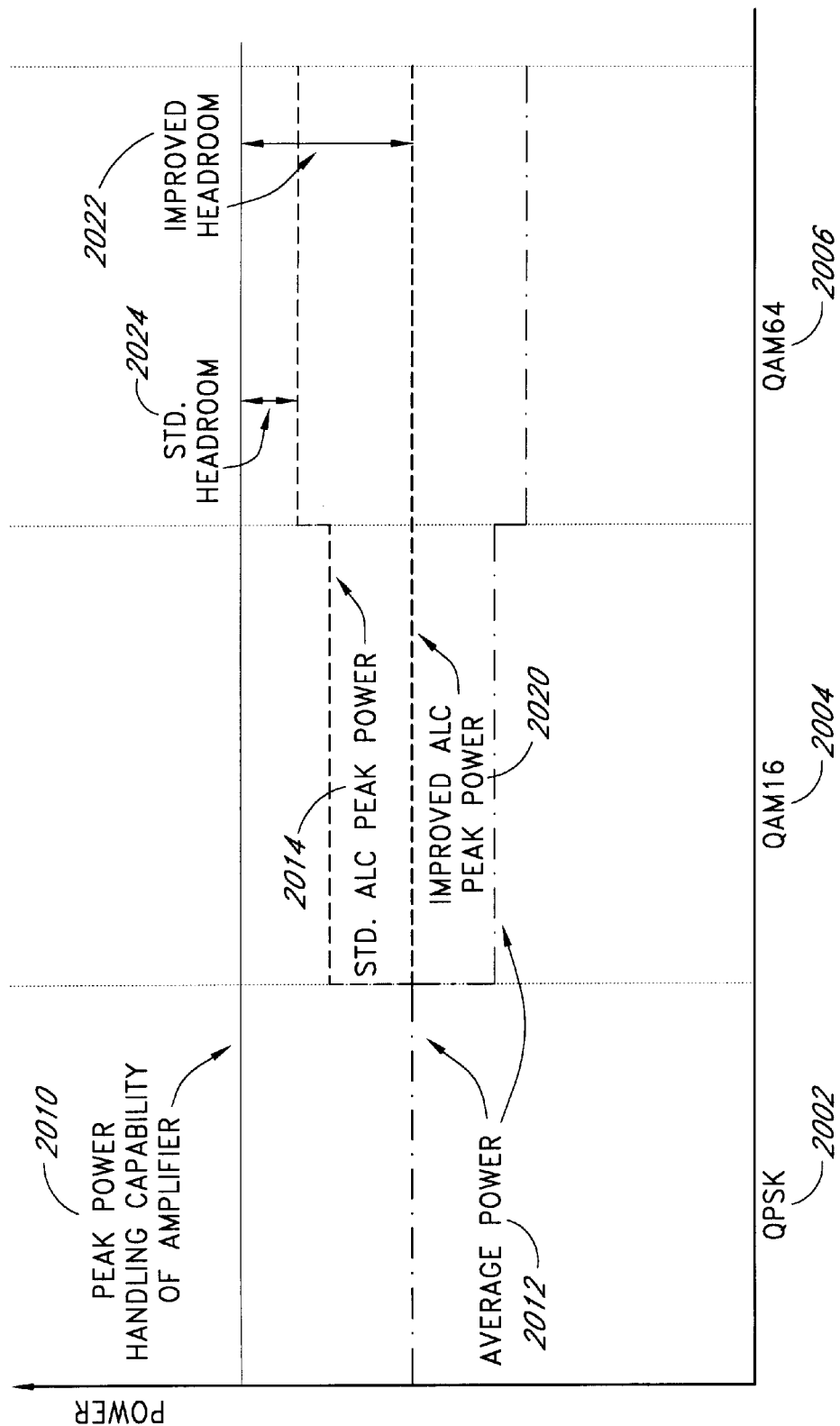
FIG. 12 is a graph of exemplary power levels for the modulation types used by the wireless communication system of FIG. 1.

Referring to FIG. 12, a graph of transmit power for three modulation types (QPSK 2002, QAM16 2004, QAM64 2006) will be discussed. A peak power handling capability of the amplifier 1808 (FIG. 10A) is shown as line 2010. A line 2012 shows an average power level for each of the modulation types. For example, an average power level for QAM16 may be about 4 dB less than an average power level for QPSK, and an average power level for QAM64 may be about 5 dB less than the average power level for QPSK. A line 2014 is shown representing peak power for QAM16 and QAM64 using the ALC circuit 1800 (FIG. 10A). FIG. 12 will be further described hereinbelow.

Figure 10B:
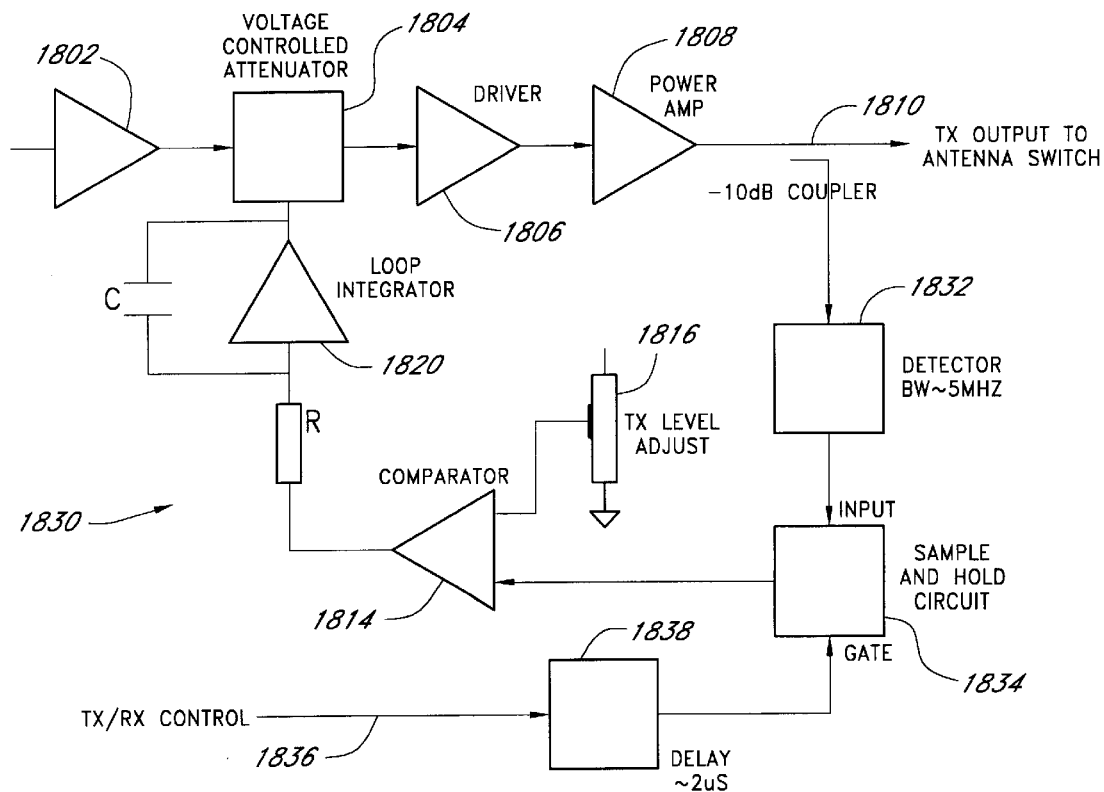
FIG. 10B is a block diagram of one embodiment of an improved automatic transmit power control circuit that is not affected by a modulation type utilized by the wireless communication system.

Referring to FIG. 10B, an improved ALC circuit or subsystem 1830 (in view of circuit 1800 (FIG. 10A)) will be described. This improved circuit 1830 uses a wideband detector 1832 (such as M/A-COM MA4E2037) and a gated Sample and Hold circuit 1834 to detect and measure the amplitude of the Tx signal during the QPSK preamble, which in the wireless communication system 100 occurs approximately two microseconds after the radio switches from Rx mode to Tx mode. In one embodiment, the detector 1832 has a bandwidth of about 5 MHz, although the detector 1832 can have a bandwidth selected from within the range of 2 MHz to 10 MHz. The Sample and Hold circuit 1834 may be implemented using high speed op-amps (such as Analog Devices AD8062), a high speed comparator (such as Maxim MAX987), and a high speed switch (such as Signetics 74HC4066).

In the wireless communication system 100, the preamble 1910 uses QPSK modulation, always occurs at the beginning of a burst, and has a known duration. By only looking at the power level in the preamble, the ALC circuit loop remains stable regardless of the modulation types used in the message (the message may contain multiple packets of multiple modulation types). Since the preamble is only 1.25 uS long (uplink) or 15 uS long (downlink), the wideband detector 1832 and the high speed Sample and Hold circuit 1834 are utilized to capture the power level during the preamble. In other embodiments, another location in the frame which may have a modulation type other than QPSK may be utilized, as long as the location in the frame is known and the modulation type is known at that location in the frame.

The Tx/Rx control signal 1836, provided through the multiplexer 170 (FIG. 4) from the switching signal block 158 (FIG. 3), feeds a delay circuit 1838. The delay circuit 1838 provides an approximately two microsecond delay to gate or trigger the Sample and Hold circuit 1834 so as to capture the power envelope of the QPSK preamble. The delay circuit 1838 may be implemented by a conventional high speed TTL gate with an RC input. The input to the delay circuit 1838 is derived from the Tx/Rx control (see the 40 MHz switching signal 158, FIG. 3). The QPSK preamble occurs a known time (~2 uS) after a Tx/Rx switch.

In the wireless communication system 100, the Tx modulator (modem 135, FIG. 3) generates QPSK, QAM16 or QAM64 and maintains the fixed amplitude at the four corner points in the constellation. By holding the Tx power level associated with the QPSK preamble constant as shown by line 2020 on FIG. 12, the circuit 1830 maintains a fixed back off or headroom (improved headroom 2022) between the peak power handling capability (2010) of the amplifier 1808 and the peak amplitude of the transmitted signal 1810 regardless of modulation type. In one embodiment, the improved headroom 2022 may be approximately 6 to 7 dB. The standard ALC circuit 1800 (FIG. 10A) may only have a headroom 2024 of approximately 1 dB for QAM64 modulation and 2 dB for QAM16. When adjusted to provide 6 dB headroom for QPSK modulation, the improved ALC circuit 1830 permits the transmit peak power 2020 to be held constant and a fixed amount of headroom to be maintained.

Specific blocks, sections, devices, functions and modules may have been set forth. However, a skilled technologist will realize that there are many ways to partition the system of the present invention, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention. Accordingly, it is to be understood that the invention is not to be limited by the specific illustrated embodiment, but only by the scope of the appended claims.

What is claimed is:

1. A method of automatically calibrating the gain of an indoor unit of a base station having an outdoor unit and a broadband cable connecting the indoor unit and outdoor unit in a wireless communication system having customer sites, the method comprising:

determining which customer sites are not operating at maximum power;

measuring, for a customer site not operating at maximum power, average received power at the outdoor unit;

comparing the average received power to a nominal level; and increasing the gain of the indoor unit if the average received power is greater than the nominal level or decreasing the gain of the indoor unit if the average received power is less than the nominal level.

2. The method defined in claim 1, additionally comprising initializing the indoor unit gain to a predetermined maximum value.

3. The method defined in claim 1, wherein the indoor unit gain is adjusted by a variable voltage attenuator.

4. The method defined in claim 3, wherein the indoor unit gain is adjusted using a delta step value selected from a range of 0.1 dB to 0.4 dB.

5. The method defined in claim 1, wherein determining includes performing an automatic level control process.

6. The method defined in claim 1, wherein adjusting the indoor unit gain compensates for losses in the cable.

7. The method defined in claim 1, wherein the acts of determining, measuring, comparing and increasing or decreasing preclude the need to calibrate the gain before installation of the base station.

8. A base station, configured to automatically calibrate a receive path gain, for use in a wireless communication system having customer sites, the base station comprising:
an outdoor unit configured to receive signals from the customer sites, wherein the signals include power readings from the customer sites;
a broadband cable connected to the outdoor unit; and
an indoor unit connected to the broadband cable and configured to receive message data from the outdoor unit through the broadband cable, wherein the indoor unit includes a processor configured to:
determine which customer sites are not operating at maximum power,
instruct the outdoor unit to measure, for a customer site not operating at maximum power, average received power at the outdoor unit,
compare the average received power to a nominal level, and
increase the gain of the indoor unit if the average received power is greater than the nominal level or decrease the gain of the indoor unit if the average received power is less than the nominal level.

9. The base station defined in claim 8, wherein the indoor unit additionally comprises a variable voltage attenuator configured to adjust the gain of the indoor unit.

10. The base station defined in claim 8, wherein the processor initializes the indoor unit gain to a predetermined maximum value.

11. The base station defined in claim 8, wherein the message data from the outdoor unit includes data indicative of average received power at the outdoor unit.

12. A method of automatically calibrating a receive path gain of a base station having an indoor unit, an outdoor unit and a broadband cable connecting the indoor unit and the outdoor unit in a wireless communication system having one or more customer sites, the method comprising:
wirelessly receiving signals from one or more customer sites;
measuring, for a customer site not operating at maximum power, power of the received signal at the outdoor unit;
comparing the power of the received signal to a predetermined level; and
increasing a receive path gain of the indoor unit if the power of the received signal is greater than the predetermined level or decreasing the receive path gain of the indoor unit if the power of the received signal is less than the predetermined level.

13. The method defined in claim 12, wherein one of the customer sites is initially transmitting the signal.

14. The method defined in claim 12, additionally comprising:
waiting for another transmitted signal from the customer site or another customer site; and
repeating the measuring, comparing, and increasing or decreasing.

15. The method defined in claim 12, additionally comprising initializing the receive path gain of the indoor unit to a predetermined maximum value.

16. The method defined in claim 15, wherein the predetermined maximum value corresponds to a longest possible cable length.

17. The method defined in claim 12, wherein the receive path gain of the indoor unit is adjusted by a variable voltage attenuator.

18. The method defined in claim 12, additionally comprising determining if a customer site is operating at maximum power.

19. The method defined in claim 18, wherein determining if the customer site is operating at maximum power includes performing an automatic level control process.

20. The method defined in claim 12, wherein adjusting the receive path gain of the indoor unit or the outdoor unit compensates for losses in the cable.

21. A method of automatically controlling the transmit power of a customer site by a base station having an indoor unit, an outdoor unit and a broadband cable connecting the indoor unit and the outdoor unit in a wireless communication system so as to automatically compensate for losses due to the cable, the method comprising:
wirelessly receiving a signal from a customer site that has started to transmit the signal;
measuring power of the received signal at the indoor unit;
comparing the power of the received signal to a predetermined level;
requesting the customer site to decrease the transmit power if the power of the received signal is greater than the predetermined level or requesting the customer site to increase the transmit power if the power of the received signal is less than the predetermined level; and
providing a maximum power status to the base station if the customer site is operating at maximum power so as to control automatic compensation for losses due to the base station cable.

22. The method defined in claim 21, additionally comprising waiting for the customer site to acknowledge the request to either decrease the transmit power or increase the transmit power.

23. A base station configured to automatically calibrate a receive path gain in a wireless communication system having customer sites, the base station comprising:
an outdoor unit wirelessly receiving signals from the customer sites, wherein the signals include power levels of one or more of the customer sites;
a broadband cable connected to the outdoor unit; and
an indoor unit connected to the broadband cable and receiving message data from the outdoor unit through the broadband cable, wherein the indoor unit includes a processor configured to:
measure, for a customer site not operating at maximum power, power of the received signal at the outdoor unit,
compare the power of the received signal to a predetermined level, and
increase a receive path gain of the indoor unit if the power of the received signal is greater than the predetermined level or decrease the receive path gain of the indoor unit if the power of the received signal is less than the predetermined level.

24. The base station defined in claim 23, wherein one of the customer sites has started to transmit signals.

25. The base station defined in claim 23, wherein the processor is additionally configured to:
wait for another signal from the customer site or another customer site, and
repeat the measure, compare, and increase or decrease.

26. The base station defined in claim 23, wherein the indoor unit additionally comprises a variable voltage attenuator configured to adjust the receive path gain of the indoor unit.

27. The base station defined in claim 23, wherein the processor initializes the indoor unit receive path gain to a predetermined maximum value.

28. The base station defined in claim 23, wherein the message data from the outdoor unit includes data indicative of the power of the received signal at the outdoor unit.

29. A base station for maintaining transmit peak power at a constant level regardless of modulation type for use in a wireless communication system, the base station comprising:

an indoor unit having a modem configured to provide an output and to use multiple modulation types within a single time division duplexing frame;

an outdoor unit connected to the indoor unit and having a transmit system configured to upconvert the output of the modem, the outdoor unit comprising:

a wideband detector configured to monitor a transmit system output signal;

a sample and hold circuit connected to the wideband detector, the sample and hold circuit having a gate input;

a delay circuit receiving a transmit/receive control signal and providing an output to the gate input of the sample and hold circuit;

a transmit level adjust circuit configured to provide a predetermined transmit output level; and a comparator configured to compare the predetermined transmit output level with the output of the sample and hold circuit so as to generate an error signal to maintain transmit peak power at a constant level.

30. The subsystem defined in claim 29, additionally comprising;

a loop integrator receiving the error signal; and a voltage controlled attenuator receiving the output of the loop integrator and maintaining transmit peak power at the constant level, the attenuator being in the transmit signal path.

31. The subsystem defined in claim 29, wherein the bandwidth of the detector is selected from the range of 2 MHz to 10 MHz.

32. The subsystem defined in claim 29, wherein the modulation type is QPSK, QAM16 or QAM64.

33. The subsystem defined in claim 29, wherein the delay circuit provides approximately two microseconds delay.

34. The subsystem defined in claim 29, wherein the sample and hold circuit measures the amplitude of the transmit output signal during a QPSK preamble so as to maintain the transmit peak power at a constant level.

35. A subsystem for maintaining transmit peak power at a constant level regardless of modulation type in an outdoor unit of a wireless communication system, the subsystem comprising:

a wideband detector configured to monitor a transmit output signal;

a sample and hold circuit connected to the wideband detector, the sample and hold circuit having a gate input;

a delay circuit providing an output, indicative of a time in the transmit output signal when a known modulation type occurs, to the gate input of the sample and hold circuit;

a transmit level adjust circuit configured to provide a predetermined transmit output level; and a comparator configured to compare the predetermined transmit output level with the output of the sample and hold circuit so as to generate an error signal used to maintain transmit peak power at a constant level.

36. The subsystem defined in claim 35, additionally comprising;

a loop integrator receiving the error signal; and a voltage controlled attenuator receiving the output of the loop integrator and maintaining transmit peak power at the constant level, the attenuator being in the transmit signal path.

37. A method of maintaining transmit peak power at a constant level regardless of modulation type in an outdoor unit of a time division duplexing wireless communication system, the method comprising:

providing a control signal at a predetermined time delay after a transition from a receive mode to a transmit mode;

measuring the amplitude of a transmit output signal based on the delayed control signal;

providing a predetermined transmit output level;

comparing the predetermined transmit output level with the amplitude of the transmit output signal; and generating a signal representative of the comparing so as to maintain transmit peak power at a constant level.

38. The method defined in claim 37, additionally comprising controlling an attenuator by the signal representative of the comparing to maintain transmit peak power at the constant level, the attenuator being in the transmit signal path.

39. The method defined in claim 37, wherein the delayed control signal enables measuring the amplitude of the transmit output signal during a QPSK preamble of a data burst.

40. The method defined in claim 37, wherein the predetermined time delay is approximately two microseconds.

* * * * *